(12) United States Patent
Kline

(10) Patent No.: US 7,453,352 B2
(45) Date of Patent: Nov. 18, 2008

(54) DATA COMMUNICATION OVER A POWER LINE

(75) Inventor: Paul A. Kline, Gaithersburg, MD (US)

(73) Assignee: Current Technologies, LLC, Germantown, MD (US)

( * ) Notice: Subject to any disclaimer, the term of this patent is extended or adjusted under 35 U.S.C. 154(b) by 0 days.

(21) Appl. No.: 11/696,896

(22) Filed: Apr. 5, 2007

(65) Prior Publication Data

US 2007/0287406 A1 Dec. 13, 2007

Related U.S. Application Data

(63) Continuation of application No. 11/374,206, filed on Mar. 14, 2006, now Pat. No. 7,218,219, which is a continuation of application No. 10/165,992, filed on Jun. 10, 2002, now Pat. No. 7,042,351, which is a continuation of application No. 10/075,708, filed on Feb. 14, 2002, now Pat. No. 6,933,835.

(60) Provisional application No. 60/268,519, filed on Feb. 14, 2001, provisional application No. 60/268,578, filed on Feb. 14, 2001.

(51) Int. Cl.
| | |
|---|---|
| *G08B 1/08* | (2006.01) |
| *H04M 11/04* | (2006.01) |
| *H04M 9/00* | (2006.01) |
| *H04H 20/71* | (2008.01) |
| *G08C 15/06* | (2006.01) |
| *H02J 3/02* | (2006.01) |

(52) U.S. Cl. ............... 340/538; 340/539.1; 340/310.11; 340/870.03; 307/3; 455/402; 455/3.01

(58) Field of Classification Search ............ 340/538, 340/538.11–538.17, 870.02–870.03, 310.11–310.18, 340/539.1; 455/402, 3.01; 307/3; 705/412
See application file for complete search history.

(56) References Cited

U.S. PATENT DOCUMENTS

| 1,547,242 A | 7/1925 | Strieby |
| 2,298,435 A | 10/1942 | Tunick |

(Continued)

FOREIGN PATENT DOCUMENTS

DE 197 28 270 A1 1/1999

(Continued)

OTHER PUBLICATIONS

Russell, B D., "Communication Alternatives for Distribution Metering and Load Management", *IEEE Transactions on Power Apparatus and Systems*, (1980),1448-1455.

(Continued)

*Primary Examiner*—Benjamin C Lee
(74) *Attorney, Agent, or Firm*—Mel Barnes; Capital Legal Group, LLC

(57) ABSTRACT

Data signals are communicated between a power line and a computer, wherein the power line provides power to the computer via a distribution transformer and the computer is in communication with a wireless communication path. A first data signal is communicated with the power line. A conversion is made between the first data signal and a second data signal capable of being communicated wirelessly. The second data signal is wirelessly communicated with the wireless communication path.

74 Claims, 9 Drawing Sheets

U.S. PATENT DOCUMENTS

| | | |
|---|---|---|
| 2,577,731 A | 12/1951 | Berger |
| 3,369,078 A | 2/1968 | Stradley |
| 3,445,814 A | 5/1969 | Spalti |
| 3,605,009 A | 9/1971 | Enge |
| 3,641,536 A | 2/1972 | Prosprich |
| 3,656,112 A | 4/1972 | Paull |
| 3,696,383 A | 10/1972 | Oishi et al. |
| 3,701,057 A | 10/1972 | Hoer |
| 3,702,460 A | 11/1972 | Blose |
| 3,810,096 A | 5/1974 | Kabat et al. |
| 3,846,638 A | 11/1974 | Wetherell |
| 3,852,740 A * | 12/1974 | Haymes ............ 340/538 |
| 3,895,370 A | 7/1975 | Valentini |
| 3,900,842 A | 8/1975 | Calabro et al. |
| 3,911,415 A | 10/1975 | Whyte |
| 3,942,168 A | 3/1976 | Whyte |
| 3,942,170 A | 3/1976 | Whyte |
| 3,944,723 A | 3/1976 | Fong |
| 3,962,547 A | 6/1976 | Pattantyus-Abraham |
| 3,964,048 A | 6/1976 | Lusk et al. |
| 3,967,264 A | 6/1976 | Whyte et al. |
| 3,973,087 A | 8/1976 | Fong |
| 3,973,240 A | 8/1976 | Fong |
| 3,980,954 A | 9/1976 | Whyte |
| 4,004,110 A | 1/1977 | Whyte |
| 4,004,257 A | 1/1977 | Geissler |
| 4,012,733 A | 3/1977 | Whyte |
| 4,016,429 A | 4/1977 | Vercellotti et al. |
| 4,017,845 A | 4/1977 | Killian et al. |
| 4,053,876 A | 10/1977 | Taylor |
| 4,057,793 A | 11/1977 | Johnson et al. |
| 4,060,735 A | 11/1977 | Pascucci et al. |
| 4,070,572 A | 1/1978 | Summerhayes |
| 4,119,948 A | 10/1978 | Ward et al. |
| 4,142,178 A | 2/1979 | Whyte et al. |
| 4,188,619 A | 2/1980 | Perkins |
| 4,239,940 A | 12/1980 | Dorfman |
| 4,250,489 A | 2/1981 | Dudash et al. |
| 4,254,402 A | 3/1981 | Perkins |
| 4,263,549 A | 4/1981 | Toppeto |
| 4,268,818 A | 5/1981 | Davis et al. |
| 4,323,882 A | 4/1982 | Gajjer |
| 4,357,598 A | 11/1982 | Melvin, Jr. |
| 4,359,644 A | 11/1982 | Foord |
| 4,367,522 A | 1/1983 | Forstbauer et al. |
| 4,383,243 A | 5/1983 | Krügel et al. |
| 4,386,436 A | 5/1983 | Kocher et al. |
| 4,408,186 A | 10/1983 | Howell |
| 4,409,542 A | 10/1983 | Becker et al. |
| 4,413,250 A | 11/1983 | Porte et al. |
| 4,419,621 A | 12/1983 | Becker et al. |
| 4,433,284 A | 2/1984 | Perkins |
| 4,442,492 A | 4/1984 | Karlsson et al. |
| 4,457,014 A | 6/1984 | Bloy |
| 4,468,792 A | 8/1984 | Baker et al. |
| 4,471,399 A | 9/1984 | Udren |
| 4,473,816 A | 9/1984 | Perkins |
| 4,473,817 A | 9/1984 | Perkins |
| 4,475,209 A | 10/1984 | Udren |
| 4,479,033 A | 10/1984 | Brown et al. |
| 4,481,501 A | 11/1984 | Perkins |
| 4,495,386 A | 1/1985 | Brown et al. |
| 4,504,705 A | 3/1985 | Pilloud |
| 4,517,548 A | 5/1985 | Ise et al. |
| 4,569,045 A | 2/1986 | Schieble et al. |
| 4,599,598 A | 7/1986 | Komoda et al. |
| 4,636,771 A | 1/1987 | Ochs |
| 4,638,298 A | 1/1987 | Spiro |
| 4,642,607 A | 2/1987 | Strom et al. |
| 4,644,321 A | 2/1987 | Kennon |
| 4,652,855 A | 3/1987 | Weikel |
| 4,668,934 A | 5/1987 | Shuey |
| 4,675,648 A | 6/1987 | Roth et al. |
| 4,683,450 A | 7/1987 | Max et al. |
| 4,686,382 A | 8/1987 | Shuey |
| 4,686,641 A | 8/1987 | Evans |
| 4,697,166 A | 9/1987 | Warnagiris et al. |
| 4,701,945 A | 10/1987 | Pedigo |
| 4,724,381 A | 2/1988 | Crimmins |
| 4,745,391 A | 5/1988 | Gajjar |
| 4,746,897 A | 5/1988 | Shuey |
| 4,749,992 A | 6/1988 | Fitzmeyer et al. |
| 4,766,414 A | 8/1988 | Shuey |
| 4,772,870 A | 9/1988 | Reyes |
| 4,785,195 A | 11/1988 | Rochelle et al. |
| 4,800,363 A | 1/1989 | Braun et al. |
| 4,815,106 A | 3/1989 | Propp et al. |
| 4,835,517 A | 5/1989 | van der Gracht et al. |
| 4,890,089 A | 12/1989 | Shuey |
| 4,903,006 A | 2/1990 | Boomgaard |
| 4,904,996 A | 2/1990 | Fernandes |
| 4,912,553 A | 3/1990 | Pal et al. |
| 4,962,496 A | 10/1990 | Vercellotti et al. |
| 4,973,940 A | 11/1990 | Sakai et al. |
| 4,979,183 A | 12/1990 | Cowart |
| 5,006,846 A | 4/1991 | Granville et al. |
| 5,056,107 A | 10/1991 | Johnson et al. |
| 5,066,939 A | 11/1991 | Mansfield, Jr. |
| 5,068,890 A | 11/1991 | Nilssen |
| 5,132,992 A | 7/1992 | Yurt et al. |
| 5,148,144 A | 9/1992 | Sutterlin et al. |
| 5,151,838 A | 9/1992 | Dockery |
| 5,185,591 A | 2/1993 | Shuey |
| 5,191,467 A | 3/1993 | Kapany et al. |
| 5,210,519 A | 5/1993 | Moore |
| 5,257,006 A | 10/1993 | Graham et al. |
| 5,264,823 A | 11/1993 | Stevens |
| 5,272,462 A | 12/1993 | Teyssandier et al. |
| 5,301,208 A | 4/1994 | Rhodes |
| 5,319,634 A | 6/1994 | Bartholomew et al. |
| 5,341,265 A | 8/1994 | Westrom et al. |
| 5,351,272 A | 9/1994 | Abraham |
| 5,355,109 A | 10/1994 | Yamazaki |
| 5,359,625 A | 10/1994 | Vander Mey et al. |
| 5,369,356 A | 11/1994 | Kinney et al. |
| 5,375,141 A | 12/1994 | Takahashi |
| 5,406,249 A | 4/1995 | Pettus |
| 5,410,720 A | 4/1995 | Osterman |
| 5,426,360 A | 6/1995 | Maraio et al. |
| 5,432,841 A | 7/1995 | Rimer |
| 5,448,229 A | 9/1995 | Lee, Jr. |
| 5,461,629 A | 10/1995 | Sutterlin et al. |
| 5,477,091 A | 12/1995 | Fiorina et al. |
| 5,481,249 A | 1/1996 | Sato |
| 5,485,040 A | 1/1996 | Sutterlin |
| 5,497,142 A | 3/1996 | Chaffanjon |
| 5,498,956 A | 3/1996 | Kinney et al. |
| 5,533,054 A | 7/1996 | DeAndrea et al. |
| 5,537,087 A | 7/1996 | Naito |
| 5,559,377 A | 9/1996 | Abraham |
| 5,568,185 A | 10/1996 | Yoshikazu |
| 5,579,221 A | 11/1996 | Mun |
| 5,579,335 A | 11/1996 | Sutterlin et al. |
| 5,592,354 A | 1/1997 | Nocentino, Jr. |
| 5,592,482 A | 1/1997 | Abraham |
| 5,598,406 A | 1/1997 | Albrecht et al. |
| 5,616,969 A | 4/1997 | Morava |
| 5,625,863 A | 4/1997 | Abraham |
| 5,630,204 A | 5/1997 | Hylton et al. |
| 5,640,416 A | 6/1997 | Chalmers |
| 5,664,002 A | 9/1997 | Skinner, Sr. |
| 5,684,450 A | 11/1997 | Brown |
| 5,691,691 A | 11/1997 | Merwin et al. |
| 5,694,108 A | 12/1997 | Shuey |

| Patent | Type | Date | Inventor |
|---|---|---|---|
| 5,705,974 | A | 1/1998 | Patel et al. |
| 5,712,614 | A | 1/1998 | Patel et al. |
| 5,717,685 | A | 2/1998 | Abraham |
| 5,726,980 | A | 3/1998 | Rickard |
| 5,748,104 | A | 5/1998 | Argyroudis et al. |
| 5,748,671 | A | 5/1998 | Sutterlin et al. |
| 5,751,803 | A | 5/1998 | Shpater |
| 5,770,996 | A | 6/1998 | Severson et al. |
| 5,774,526 | A | 6/1998 | Propp et al. |
| 5,777,544 | A | 7/1998 | Vander Mey et al. |
| 5,777,545 | A | 7/1998 | Patel et al. |
| 5,777,769 | A | 7/1998 | Coutinho |
| 5,778,116 | A | 7/1998 | Tomich |
| 5,796,607 | A | 8/1998 | Le Van Suu |
| 5,798,913 | A | 8/1998 | Tiesinga et al. |
| 5,801,643 | A | 9/1998 | Williams et al. |
| 5,802,102 | A | 9/1998 | Davidovici |
| 5,805,053 | A | 9/1998 | Patel et al. |
| 5,805,458 | A | 9/1998 | McNamara et al. |
| 5,818,127 | A | 10/1998 | Abraham |
| 5,818,821 | A | 10/1998 | Schurig |
| 5,828,293 | A | 10/1998 | Rickard |
| 5,835,005 | A | 11/1998 | Furukawa et al. |
| 5,847,447 | A | 12/1998 | Rozin et al. |
| 5,850,114 | A | 12/1998 | Froidevaux |
| 5,856,776 | A | 1/1999 | Armstrong et al. |
| 5,864,284 | A | 1/1999 | Sanderson et al. |
| 5,870,016 | A | 2/1999 | Shresthe |
| 5,880,677 | A | 3/1999 | Lestician |
| 5,881,098 | A | 3/1999 | Tzou |
| 5,892,430 | A | 4/1999 | Wiesman et al. |
| 5,892,758 | A | 4/1999 | Argyroudis |
| 5,929,750 | A | 7/1999 | Brown |
| 5,933,071 | A | 8/1999 | Brown |
| 5,933,073 | A | 8/1999 | Shuey |
| 5,937,003 | A | 8/1999 | Sutterlin et al. |
| 5,937,342 | A | 8/1999 | Kline |
| 5,949,327 | A | 9/1999 | Brown |
| 5,952,914 | A | 9/1999 | Wynn |
| 5,963,585 | A | 10/1999 | Omura et al. |
| 5,977,650 | A | 11/1999 | Rickard et al. |
| 5,978,371 | A | 11/1999 | Mason, Jr. et al. |
| 5,982,276 | A | 11/1999 | Stewart |
| 5,994,998 | A | 11/1999 | Fisher et al. |
| 5,994,999 | A | 11/1999 | Ebersohl |
| 6,014,386 | A | 1/2000 | Abraham |
| 6,023,106 | A | 2/2000 | Abraham |
| 6,037,678 | A | 3/2000 | Rickard |
| 6,037,857 | A | 3/2000 | Behrens et al. |
| 6,040,759 | A | 3/2000 | Sanderson |
| 6,091,932 | A | 7/2000 | Langlais |
| 6,104,707 | A | 8/2000 | Abraham |
| 6,121,765 | A | 9/2000 | Carlson |
| 6,130,896 | A | 10/2000 | Lueker et al. |
| 6,140,911 | A | 10/2000 | Fisher et al. |
| 6,141,634 | A | 10/2000 | Flint et al. |
| 6,144,292 | A | 11/2000 | Brown |
| 6,150,955 | A | 11/2000 | Tracy et al. |
| 6,151,330 | A | 11/2000 | Liberman |
| 6,151,480 | A | 11/2000 | Fischer et al. |
| 6,154,488 | A | 11/2000 | Hunt |
| 6,157,292 | A | 12/2000 | Piercy et al. |
| 6,172,597 | B1 | 1/2001 | Brown |
| 6,175,860 | B1 | 1/2001 | Gaucher |
| 6,177,849 | B1 | 1/2001 | Barsellotti et al. |
| 6,212,658 | B1 | 4/2001 | Le Van Suu |
| 6,226,166 | B1 | 5/2001 | Gumley et al. |
| 6,229,434 | B1 | 5/2001 | Knapp et al. |
| 6,239,722 | B1 | 5/2001 | Colton et al. |
| 6,243,413 | B1 | 6/2001 | Beukema |
| 6,243,571 | B1 | 6/2001 | Bullock et al. |
| 6,246,677 | B1 | 6/2001 | Nap et al. |
| 6,255,805 | B1 | 7/2001 | Papalia et al. |
| 6,255,935 | B1 | 7/2001 | Lehmann et al. |
| 6,262,672 | B1 | 7/2001 | Brooksby et al. |
| 6,275,144 | B1 | 8/2001 | Rumbaugh |
| 6,282,405 | B1 | 8/2001 | Brown |
| 6,297,729 | B1 | 10/2001 | Abali et al. |
| 6,297,730 | B1 | 10/2001 | Dickinson |
| 6,300,881 | B1 | 10/2001 | Yee et al. |
| 6,313,738 | B1 | 11/2001 | Wynn |
| 6,317,031 | B1 | 11/2001 | Rickard |
| 6,331,814 | B1 | 12/2001 | Albano et al. |
| 6,335,672 | B1 | 1/2002 | Tumlin et al. |
| 6,346,875 | B1 | 2/2002 | Puckette et al. |
| 6,373,376 | B1 | 4/2002 | Adams et al. |
| 6,373,399 | B1 | 4/2002 | Johnson et al. |
| 6,384,580 | B1 | 5/2002 | Ochoa et al. |
| 6,396,391 | B1 | 5/2002 | Binder |
| 6,396,392 | B1 | 5/2002 | Abraham |
| 6,404,773 | B1 | 6/2002 | Williams et al. |
| 6,407,987 | B1 | 6/2002 | Abraham |
| 6,414,578 | B1 | 7/2002 | Jitaru |
| 6,425,852 | B1 | 7/2002 | Epstein et al. |
| 6,441,723 | B1 | 8/2002 | Mansfield, Jr. et al. |
| 6,449,318 | B1 | 9/2002 | Rumbaugh |
| 6,452,482 | B1 | 9/2002 | Cern |
| 6,459,998 | B1 | 10/2002 | Hoffman |
| 6,480,510 | B1 | 11/2002 | Binder |
| 6,486,747 | B1 | 11/2002 | DeCramer et al. |
| 6,492,897 | B1 | 12/2002 | Mowery, Jr. |
| 6,496,104 | B2 | 12/2002 | Kline |
| 6,504,357 | B1 | 1/2003 | Hemminger et al. |
| 6,507,573 | B1 | 1/2003 | Brandt et al. |
| 6,515,485 | B1 | 2/2003 | Bullock et al. |
| 6,522,626 | B1 | 2/2003 | Greenwood |
| 6,522,650 | B1 | 2/2003 | Yonge, III et al. |
| 6,538,577 | B1 | 3/2003 | Ehrke et al. |
| 6,549,120 | B1 | 4/2003 | De Buda |
| 6,590,493 | B1 | 7/2003 | Rasimas |
| 6,611,134 | B2 | 8/2003 | Chung |
| 6,618,709 | B1 | 9/2003 | Sneeringer |
| 6,624,745 | B1 | 9/2003 | Willer |
| 6,646,447 | B2 | 11/2003 | Cern et al. |
| 6,650,249 | B2 | 11/2003 | Meyer et al. |
| 6,683,531 | B2 | 1/2004 | Diamanti et al. |
| 6,684,245 | B1 | 1/2004 | Shuey et al. |
| 6,686,832 | B2 | 2/2004 | Abraham |
| 6,710,721 | B1 | 3/2004 | Holowick |
| 6,737,984 | B1 | 5/2004 | Welles et al. |
| 6,778,099 | B1 | 8/2004 | Meyer et al. |
| 6,785,532 | B1 | 8/2004 | Rickard |
| 6,785,592 | B1 | 8/2004 | Smith et al. |
| 6,788,745 | B1 | 9/2004 | Lim et al. |
| 6,809,633 | B2 | 10/2004 | Cern |
| 6,842,459 | B1 | 1/2005 | Binder |
| 6,854,059 | B2 | 2/2005 | Gardner |
| 6,922,135 | B2 | 7/2005 | Abraham |
| 6,933,835 | B2 | 8/2005 | Kline |
| 6,954,814 | B1 | 10/2005 | Leach |
| 6,958,680 | B2 | 10/2005 | Kline |
| 6,980,089 | B1 | 12/2005 | Kline |
| 6,985,714 | B2 | 1/2006 | Akiyama et al. |
| 6,998,962 | B2 | 2/2006 | Cope et al. |
| 7,042,351 | B2 * | 5/2006 | Kline ......................... 340/538 |
| 7,046,882 | B2 | 5/2006 | Kline |
| 7,064,654 | B2 | 6/2006 | Berkman |
| 7,089,089 | B2 | 8/2006 | Cumming et al. |
| 7,218,219 | B2 * | 5/2007 | Kline ......................... 340/538 |
| 7,248,158 | B2 * | 7/2007 | Berkman et al. ............ 340/538 |
| 2001/0010032 | A1 | 7/2001 | Ehlers et al. |
| 2001/0038329 | A1 | 11/2001 | Diamanti et al. |
| 2001/0038343 | A1 | 11/2001 | Meyer et al. |
| 2001/0052843 | A1 | 12/2001 | Wiesman et al. |
| 2001/0054953 | A1 | 12/2001 | Kline |
| 2002/0002040 | A1 | 1/2002 | Kline et al. |

| | | | |
|---|---|---|---|
| 2002/0010870 A1 | 1/2002 | Gardner | |
| 2002/0048368 A1 | 4/2002 | Gardner | |
| 2002/0060624 A1 | 5/2002 | Zhang | |
| 2002/0063635 A1 | 5/2002 | Shincovich | |
| 2002/0080010 A1 | 6/2002 | Zhang | |
| 2002/0084914 A1 | 7/2002 | Jackson et al. | |
| 2002/0095662 A1 | 7/2002 | Ashlock et al. | |
| 2002/0097953 A1 | 7/2002 | Kline | |
| 2002/0098867 A1 | 7/2002 | Meiksen et al. | |
| 2002/0098868 A1 | 7/2002 | Meiksen et al. | |
| 2002/0105413 A1 | 8/2002 | Cern et al. | |
| 2002/0109585 A1 | 8/2002 | Sanderson | |
| 2002/0110310 A1 | 8/2002 | Kline | |
| 2002/0110311 A1 | 8/2002 | Kline | |
| 2002/0118101 A1 | 8/2002 | Kline | |
| 2002/0121963 A1 | 9/2002 | Kline | |
| 2002/0154000 A1 | 10/2002 | Kline | |
| 2002/0171535 A1 | 11/2002 | Cern | |
| 2003/0007576 A1 | 1/2003 | Alavi et al. | |
| 2003/0039257 A1 | 2/2003 | Manis | |
| 2003/0054793 A1 | 3/2003 | Manis et al. | |
| 2003/0062990 A1 | 4/2003 | Schaeffer, Jr. et al. | |
| 2003/0063723 A1 | 4/2003 | Booth et al. | |
| 2003/0067910 A1 | 4/2003 | Razazian et al. | |
| 2003/0090368 A1 | 5/2003 | Ide | |
| 2003/0107477 A1 | 6/2003 | Ide | |
| 2003/0129978 A1 | 7/2003 | Akiyama et al. | |
| 2003/0133420 A1 | 7/2003 | Haddad | |
| 2003/0149784 A1 | 8/2003 | Ide | |
| 2003/0158677 A1 | 8/2003 | Swarztrauber et al. | |
| 2003/0160684 A1 | 8/2003 | Cern | |
| 2003/0169155 A1 | 9/2003 | Mollenkopf et al. | |
| 2003/0184433 A1 | 10/2003 | Zalitzky et al. | |
| 2003/0232599 A1 | 12/2003 | Dostert | |
| 2004/0032320 A1 | 2/2004 | Zalitzky et al. | |
| 2004/0037317 A1 | 2/2004 | Zalitzky et al. | |
| 2004/0056734 A1 | 3/2004 | Davidow | |
| 2004/0064276 A1 | 4/2004 | Villicana et al. | |
| 2004/0083066 A1 | 4/2004 | Hayes et al. | |
| 2004/0227621 A1 | 11/2004 | Cope et al. | |
| 2004/0239522 A1 | 12/2004 | Gallagher | |
| 2005/0046550 A1 | 3/2005 | Crenshaw et al. | |
| 2005/0090995 A1 | 4/2005 | Sonderegger | |
| 2005/0285720 A1 | 12/2005 | Cope et al. | |
| 2006/0007016 A1 | 1/2006 | Borkowski et al. | |
| 2006/0031180 A1 | 2/2006 | Tamarkin et al. | |
| 2006/0036795 A1 | 2/2006 | Leach | |
| 2006/0045105 A1 | 3/2006 | Dobosz et al. | |
| 2006/0066456 A1 | 3/2006 | Jonker et al. | |
| 2006/0071810 A1 | 4/2006 | Scoggins et al. | |
| 2006/0091877 A1 | 5/2006 | Robinson et al. | |
| 2006/0106554 A1 | 5/2006 | Borkowski et al. | |
| 2006/0132299 A1 | 6/2006 | Robbins et al. | |
| 2006/0145834 A1 | 7/2006 | Berkman et al. | |
| 2007/0165835 A1 | 7/2007 | Berkman | |
| 2007/0287406 A1 | 12/2007 | Kline | |
| 2008/0018491 A1 | 1/2008 | Berkamn et al. | |

FOREIGN PATENT DOCUMENTS

| | | | |
|---|---|---|---|
| DE | 100 08 602 A1 | 6/2001 | |
| DE | 100 12 235 C2 | 12/2001 | |
| DE | 100 47 648 A1 | 4/2002 | |
| EP | 0 141 673 A2 | 5/1985 | |
| EP | 0 581 351 A1 | 2/1994 | |
| EP | 0 632 602 A2 | 1/1995 | |
| EP | 0 470 185 B1 | 11/1995 | |
| EP | 0 822 721 A2 | 2/1998 | |
| EP | 0 822 721 A3 | 2/1998 | |
| EP | 0 913 955 A2 | 5/1999 | |
| EP | 0 933 883 A2 | 8/1999 | |
| EP | 0 933 883 A3 | 8/1999 | |
| EP | 0 948 143 A2 | 10/1999 | |
| EP | 0 959 569 A1 | 11/1999 | |
| EP | 1 011 235 A2 | 6/2000 | |
| EP | 1 014 640 A2 | 6/2000 | |
| EP | 1 043 866 A2 | 10/2000 | |
| EP | 1 043 866 A3 | 10/2000 | |
| EP | 1 075 091 A1 | 2/2001 | |
| EP | 0 916 194 B1 | 9/2001 | |
| EP | 1 011 235 A3 | 5/2002 | |
| EP | 1 014 640 A3 | 7/2002 | |
| EP | 1 021 866 B1 | 10/2002 | |
| ES | 2 122 920 A1 | 12/1998 | |
| FR | 2 326 087 | 7/1976 | |
| GB | 1 548 652 | 7/1979 | |
| GB | 2 101 857 A | 1/1983 | |
| GB | 2 293 950 A | 4/1996 | |
| GB | 2 315 937 A | 2/1998 | |
| GB | 2 331 683 A | 5/1999 | |
| GB | 2 335 335 A | 9/1999 | |
| GB | 2 341 776 A | 3/2000 | |
| GB | 2 342 264 A | 4/2000 | |
| GB | 2 347 601 A | 9/2000 | |
| JP | 1276933 | 11/1989 | |
| NZ | 276741 | 7/1998 | |
| WO | 84/01481 A1 | 4/1984 | |
| WO | 90/13950 A2 | 11/1990 | |
| WO | 92/16920 A1 | 10/1992 | |
| WO | 93/07693 A1 | 4/1993 | |
| WO | 95/29536 | 11/1995 | |
| WO | 98/01905 A1 | 1/1998 | |
| WO | 98/33258 A2 | 7/1998 | |
| WO | 98/33258 A3 | 7/1998 | |
| WO | 98/40980 A1 | 9/1998 | |
| WO | 99/59261 A1 | 11/1999 | |
| WO | WO-99/59261 A1 | 11/1999 | |
| WO | 00/16496 A2 | 3/2000 | |
| WO | 00/59076 A1 | 10/2000 | |
| WO | 00/60701 A1 | 10/2000 | |
| WO | 00/60822 | 10/2000 | |
| WO | 01/08321 A1 | 2/2001 | |
| WO | 01/43305 A1 | 6/2001 | |
| WO | 01/50625 A2 | 7/2001 | |
| WO | 01/50625 A3 | 7/2001 | |
| WO | 01/50628 A1 | 7/2001 | |
| WO | 01/50629 A1 | 7/2001 | |
| WO | 01/63787 A1 | 8/2001 | |
| WO | 01/82497 A1 | 11/2001 | |
| WO | 02/17509 A1 | 2/2002 | |
| WO | 02/37712 A1 | 5/2002 | |
| WO | 02/054605 A1 | 7/2002 | |

OTHER PUBLICATIONS

"Outlook Conference 2004: Amperion Deployment Overview", *Primen Conference*, (May 7, 2004), 1-10.

"Centralized Commercial Building Applications with the Lonworks ® PLT-21 Power Line Transceiver", *Lonworks Engineering Bulletin*, Echelon, (Apr. 1997),1-22.

"Demand Side Management with LONWORKS® Power Line Transceivers", *LONWORKS Engineering Bulletin*, (Dec. 1996),1-36.

"EMETCON Automated Distribution System", *ABB Power T & D Company, Inc*, (Jan. 1990),1-14.

"IEEE Guide for Power-Line Carrier Applications, ANSI/IEEE Std 643-1980", *The Institute of Electrical and Electronics Engineers, Inc.*, (1980),1-80.

"Intellon Corporation Test Summary for Transformerless Coupler Study", *Intellon No News Wires, DOT/NHTSA Order No. DTNH22-98-P-07632*, (Dec. 24, 1998),1-18.

"PLC, A New Competitor in Broadband Internet Access", *Power Line Communications Conference*, (Dec. 12, 2001),1-60.

"Power Line Communications", *Power Line Communications*, www.plexeon.com/power.html, (1998),1-2.

"Summary of an IEEE Guide for Power-Line Carrier Applications", *IEEE Transactions on Power Apparatus and Systems*, (Nov./Dec. 1980),2334-2337.

Barstow, J M., "A Carrier Telephone System for Rural Service", *AIEE Transactions*, (1947),301-307.

Feduschak, N A., "Waiting in the Wings: Is Powerline Technology Ready to Compete with Cable?", www.cabletoday.com/ic2/archives/0301/0301powerline.htm, (Mar. 2001),1-5.

Naredo, J L., et al., "Design of Power Line Carrier Systems on Multitransposed Delta Transmission Lines",*IEEE Transactions on Power Delivery*,(1991),952-958.

Patent Abstracts of Japan, Japanese Publication No. 10200544 A2, published Jul. 31, 1998, (Matsushita Electric Works, LTD).

Tohoku Electric Power, Co., Inc., "Tohoku Electric Develops High-Speed Communications System Using Power Distribution Lines,"*Tohoku Currents*, Spring 1998, 8(1), 2 pages (http://www.tohoku-epco.co.jp/profil/kurozu/c_vol8_1/art04.htm).

Power Line Communications Conference entitled, "PLC, A New Competitor in Broadband Internet Access," Dec. 11-12, 2001, Washington, D.C., 60 pages.

"Embedded Power Line Carrier Modem," Archnet Electronic Technology, http://www.archnetco.com/english/product/ATL90.htm, © 2001, 3 pages.

"Archnet: Automatic Meter Reading System Power Line Carrier Communication", www.archnetco.com/english/product/product_sl.htm, © 2001, 3 pages.

Feduschak, N.A., "Waiting in the Wings: Is Powerline Technology Ready to Compete Cable?", Mar. 2001, www.cabletoday.com/ic2/archives/0301/0301powerline.htm, 5 pages.

"Signalling on Low-Voltage Electrical Installations in the Frequency Band 3kHz to 148.5kHz-Part 4: Filters at the Interface of the Indoor and Outdoor Electricity Network", *CLC SC 105 A (Secretariat)* May 1992, 62, 1-11.

"Intellon Corporation Test Summary for Transformerless Coupler Study", *Intellon No News Wires*, Dec. 24, 1998, DOT/NHTSA Order No. DTNH22-98-P-07632, pp. 1-18.

EMETCON *Automated Distribution System*, ABB Power T & D Company, Inc., Jan. 1990, Raleigh, North Carolina, No. B-919A, 14 pages.

"Dedicated Passive Backbone for Power Line Communications", *IBM Technical Disclosure Bulletin*, Jul. 1997, 40(7), 183-185.

"Centralized Commercial Building Applications with the Lonworks ® PLT-21 Power Line Transceiver", *Lonworks Engineering Bulletin*, Echelon, Apr. 1997, pp. 1-22.

Plexeon Logistics, Inc., "Power Line Communications", www.plexeon.com/power.html, © 1998-2003, 2 pages.

"EMETCON Automated Distribution System: Communications Guide", *Westinghouse ABB Power T & D Company Technical Manual 42-6001A*, Sep. 1989, 55 pages.

Abraham, K.C. et al., "A Novel High-Speed PLC Communication Modem", *IEEE Transactions on Power Delivery*, Oct. 1992, vol. 7, No. 4, pp. 1760-1768.

J.M. Barstow., "A Carrier Telephone System for Rural Service", *AIEE Transactions*, 1947, 66, 301-307.

Chang, S.S.L., "Power-Line Carrier", *Fundamentals Handbook of Electrical and Computer Engineering*, vol. II-Communication, Control, Devices and Systems, John Wiley & Sons, New York, 1983, 617-627.

Chen, Y-F. et al. "Baseband Transceiver Design of a 128-Kbps Power-Line Modem for Household Applications", *IEEE Transactions on Power Delivery*, 2002, 17(2), 338-344.

Coakley, N.G. et al., "Real-Time Control of a Servosystem Using the Inverter-Fed Power Lines to Communicate Sensor Feedback", *IEEE Transactions on Industrial Electronics*, 1999, 46(2), 360-369.

Esmailian, T. et al., "A Discrete Multitone Power Line Communication System", *Department of Electrical and Computer Engineering*, University of Toronto, Ontario Canada, 2000 IEEE, pp. 2953-2956.

Kawamura, A. et al., "Autonomous Decentralized Manufacturing System Using High-speed Network with Inductive Transmission of Data and Power", *IEEE*, 1996, 940-945.

Kim, W-O., et al., "A Control Network Architecture Based on EIA-709.1 Protocol for Power Line Data Communications", *IEEE Transactions on Consumer Electronics*, 2002, 48(3), 650-655.

Lim, C.K. et al., "Development of a Test Bed for High-Speed Power Line Communications", School of Electrical and Electronic Engineering, Nanyang Technological University, Singapore, *IEEE*, 2000, 451-456.

Lokken, G. et al., "The Proposed Wisconsin electric Power Company Load Management System Using Power Line Carrier Over Distribution Lines", *1976 National Telecommunications Conference, IEEE*, 1976, 2.2-12.2-3.

Marthe, E. et al., "Indoor Radiated Emission Associated with Power Line Communication Systems", *Swiss Federal Institute of Technology Power Systems Laboratory IEEE*, 2001, 517-520.

Naredo, J.L. et al., "Design of Power Line Carrier Systems on Multitransposed Delta Transmission Lines", *IEEE Transactions on Power Delivery*, 1991, 6(3), 952-958.

Nichols, K., "Build a Pair of Line-Carrier Modems", *CRC Electronics-Radio Electronics*, 1988, 87-91.

Okazaki, H, et al., "A Transmitting, and Receiving Method for CDMA Communications Over Indoor Electrical Power Lines", *IEEE*, 1998, pp. VI-522-VI-528.

B. Don Russell, "Communication Alternatives for Distribution Metering and Load Management", *IEEE Transactions on Power Apparatus and Systems*, 1980, vol. PAS-99(4), pp. 1448-1455.

Sado, WN. et al., "Personal Communication on Residential Power Lines- Assessment of Channel Parameters", Nov. 6-10, 1995, *IEEE*, 532-537.

LONWORKS Engineering Bulletin, "Demand Side Management with LONWORKS® Power Line Transceivers," Dec. 1996, 36 pages.

HomePlug™ Powerline Alliance, HomePlug Initital Draft Medium Interface Specification, May 19, 2000, 109 pages.

HomePlug™ Powerline Alliance, HomePlug 0.5 Draft Medium Interface Specification, Nov. 28, 2000, 133 pages.

HomePlug™ Powerline Alliance, HomePlug Initial Draft Medium Interface Specification, Jul. 27, 2000, 109 pages.

HomePlug™ Powerline Alliance, HomePlug 1.01 Specification, Dec. 1, 2001, 139 pages.

Summary of an IEEE Guide for Power-Line Carrier Applications, A Report by the Power System Communications Committee, *IEEE Transactions on Power Apparatus and Systems*, vol. PAS-99, No. 6, Nov./Dec. 1980, pp. 2334-2337.

De Wilde, W. R. et al., "Upwards to a Reliable Bi-Directional Communication Link on the LV Power Supplies for Utility Services: Field Tests in Belgium," Apr. 3-5, 1990, *Sixth International Conference on*, Manchester, UK, pp. 168-172.

Tanaka, M., "Transmission Characteristics of a Power Line Used for Data Communications at High Frequencies," IEEE Transactions on Consumer Electronics, Feb. 1989, vol. 35, No. 1, pp. 37-42.

Hasler, E. F. et al., "Communication Systems Using Bundle Conductor Overhead Power Lines," IEEE Transactions on Power Apparatus and Systems, Mar./Apr. 1975, vol. PAS-94, No. 2, pp. 344-349.

IEEE Guide for Power-Line Carrier Applications, ANSI/IEEE Std 643-1980, © 1980 by The Institute of Electrical and Electronics Engineers, Inc., pp. 1-80.

Hatori, M. et al., "Home Informatization and Standarization of Home Bus," IEEE Transactions on Consumer Electronics, Aug. 1986, vol. CE-32, No. 3, pp. 542-549.

Hunt, J. M. et al., "Electrical Energy Monitoring and Control System for the Home," IEEE Transactions on Consumer Electronics, Aug. 1986, vol. CE-32, No. 3, pp. 578-583.

Gutzwiller, F. W. et al., "Homenet: A Control Network for Consumer Applications," IEEE Transactions on Consumer Electronics, Aug. 1983, vol. CE-29, No. 3, pp. 297-304.

Burrascano, P. et al., "Digital Signal Transmission on Power Line Carrier Channels: An Introduction," IEEE Transactions on Power Delivery, Jan. 1987, vol. PWRD-2, No. 1, pp. 50-56.

Burr, A. G. et al., "Effect of HF Broadcast Interference on PowerLine Telecommunications Above 1 Mhz," 201 1998 IEEE, pp. 2870-2875.

Onunga, J. et al., "Distribution Line Communications Using CSMA Access Control with Priority Acknowledgements," IEEE Transactions on Power Delivery, Apr. 1989, vol. 4, No. 2, pp. 878-886.

Tanaka, M., "High Frequency Noise Power Spectrum, Impedance and Transmission Loss of Power Line in Japan on Intrabuilding Power Line Communications," *IEEE Transactions on Consumer Electronics*, May 1988, vol. 34, No. 2, pp. 321-326.

Meng, H. et al., "A Transmission Line Model for High-Frequency Power Line Communication Channel," © 2002 IEEE, pp. 1290-1295.

Burrascano, P. et al., "Performance Evaluation of Digital Signal Transmission Channels on Coronating Power Lines," © 1988 IEEE, pp. 365-368.

DiClementi, D. A. et al., "Electrical Distribution System Power Line Characterization," 201 1996 IEEE, pp. 271-276.

Yoshitoshi, M. et al., "Proposed Interface Specifications for Home Bus," IEEE Transactions on Consumer Electronics, Aug. 1986, vol. CE-32, No. 3, pp. 550-557.

O'Neal, Jr., J. B., "The Residential Power Circuit as a Communication Medium," IEEE Transactions on Consumer Electronics, Aug. 1986, vol. CE-32, No. 3, pp. 567-577.

Dostert, K., "EMC Aspects of High Speed Powerline Communications," Proceedings of the 15th International Wroclaw Symposium and Exhibition on Electromagnetic Capability, Jun. 27-30, 2000; Wroclaw, Poland, pp. 98-102.

Piety, R. A., "Intrabuilding Data Transmission Using Power-Line Wiring," Hewlett-Packard Journal, May 1987, pp. 35-40.

Dostert, K., Powerline Communications, Ch. 5, pp. 286, 288-292, Prentice Hall PTR, Upper Saddle River, NJ © 2001.

Rivkin, S.R., "Co-Evoluation of Electric & Telecommunications Networks," *The Electricity Journal*, May 1998, 71-76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Conslting, Jul. 16, 2002, 5 pages.

"Power Line Communications Solutions", www.echelon.com/products/oem/transceivers/powerline/default.htm, 2 pages.

"Texas Instruments: System Block Diagrams; Power Line Communication (Generic)", http://focus.ti.com/docs/apps/catalog/resources/blockdiagram.jhtml?bdId=638, 1 page.

"Coaxial Feeder Cables [Engineering Notes]", *PYE Telecommunications Limited Publication Ref No. TSP507/1*, Jun. 1975, Cambridge, England, 15 pages.

Kilbourne, B., "EEI Electric Perspectives: The Final Connection", www.eei.org/ep/editorial/Jul-01/0701conenct.htm, 7 pages.

Written Opinion dated Aug. 20, 2003, from PCT/US02/04310.

International Search Report dated Aug. 7, 2002, from PCT/US02/04300.

Written Opinion dated Mar. 21, 2003, from PCT/US02/04300.

\* cited by examiner

DATA COMMUNICATION OVER A POWER LINE

CROSS REFERENCE TO RELATED APPLICATIONS

This application is a continuation of, and claims priority to, U.S. patent application Ser. No. 11/374,206, filed Mar. 14, 2006, now U.S. Pat. No. 7,218,219 which is a continuation of U.S. patent application Ser. No. 10/165,992, filed Jun. 10, 2002, now U.S. Pat. No. 7,042,351 (both of which are incorporated herein by reference in their entirety), and which is a continuation of and claims priority to Ser. No. 10/075,708, filed Feb. 14, 2002, now U.S. Pat. No. 6,933,835, which claims priority to U.S. Provisional Patent Application Ser. No. 60/268,519 and U.S. Provisional Patent Application Ser. No. 60/268,578, both filed Feb. 14, 2001.

FIELD OF THE INVENTION

The invention generally relates to data communication over power lines and more particularly, to devices and methods for communicating data signals with the power lines.

BACKGROUND OF THE INVENTION

A well-established power distribution system exists throughout most of the United States and other countries. The power distribution system provides power to customers via power lines. With some modification, the infrastructure of the existing power distribution system can be used to provide data communication in addition to power delivery. That is, data signals can be carried by the existing power lines that already have been run to many homes and offices. The use of the existing power lines may help reduce the cost of implementing a data communication system. To implement the data communication system, data signals are communicated to and from the power line at various points in the power distribution system, such as, for example, near homes, offices, Internet service providers, and like.

While the concept may sound simple, there are many challenges to overcome before using power lines for data communication. For example, a sufficient signal-to-noise ratio should be maintained, a sufficient data transfer rate should be maintained (e.g., 10 Mbps), "add on" devices should be installable without significantly disrupting power supply to power customers, "add on" devices should be designed to withstand outdoor conditions, bi-directional data communication should be supported, data communication system customers should be protected from the voltages present on power lines, and the like.

Power system transformers are one obstacle to using power distribution lines for data communication. Transformers convert voltages between power distribution system portions. For example, a power distribution system may include a high voltage portion, a medium voltage portion, and a low voltage portion and a transformers converts the voltages between these portions. Transformers, however, act as a low-pass filter, passing low frequency signals (e.g., 50 or 60 Hz power signals) and impeding high frequency signals (e.g., frequencies typically used for data communication) from passing through the transformer. As such, a data communication system using power lines for data transmission faces a challenge in passing the data signals from the power lines a to customer premise.

Moreover, accessing data signals on a power lines is a potential safety concern. Medium voltage power lines can operate from about 1000 V to about 100 kV which can generate high current flows. As such, any electrical coupling to a medium voltage power line is a concern. Therefore, a need exists for a device that can safely communicate data signals with a medium voltage power line and yet provide electrical isolation from the medium voltage power line.

In addition to communicating a data signal with a medium voltage power line, it would be advantageous to communicate the data signal to a customer premise. That is, a need also exists for a device that electrically communicates a data signal between a medium voltage power line and a low voltage power line, while maintaining electrical isolation between the medium voltage power line and the low voltage power line.

SUMMARY OF THE INVENTION

The invention is directed to communicating data signals with a power line and wirelessly communicating the data signals to a computer, wherein the power line feeds power to the computer via a distribution transformer. A first data signal is communicated with the power line, wherein the first data signal is an analog data signal capable of being carried by the power line. A conversion is made between the first data signal and a second data signal capable of being transmitted wirelessly to the computer. The second data signal is wirelessly communicated with the computer.

The first data signal may be inductively communicated with the power line. The converting may comprise modulating and demodulating the first data signal with Orthogonal Frequency Division Multiplexing and routing the first data signal. The converting may further comprise converting the first data signal to a radio frequency signal, to a microwave frequency signal, to a signal formatted in compliance with an IEEE 802.11 protocol, to a light data signal and then to a wireless data signal, and to an acoustic frequency signal.

The first data signal may be received from the power line and converted to a data signal capable of being transmitted wirelessly to the computer and then be transmitted to the computer. The second data signal may be wirelessly received from the computer, converted to an analog data signal capable of being carried by the power line and communicated to the power line.

A system for communicating data between a power line and a computer includes a coupling device, a signal converter, and a wireless transceiver. The coupling device couples to the power line and communicates a first data signal with the power line. The signal converter communicates with the coupling device and converts between the first data signal and a second data signal capable of being transmitted wirelessly to the computer. The wireless transceiver wirelessly communicates the second data signal with the computer.

The coupling device may comprise an inductor. The signal converter may comprise a modem, a data router, an optoelectronic transceiver, a radio frequency transceiver, a microwave frequency transceiver, an antenna, and an acoustic transceiver.

The above-listed features, as well as other features, of the invention will be more fully set forth hereinafter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

A power line coupler and a power line bridge communicate data signals across a transformer that would otherwise filter the data signals from passing through the transformer. Further, the power line coupler provides high electrical isolation between the transformer primary side and secondary side, thereby preventing substantial power flow through the power line coupler and the power line bridge. It should be appreciated that the functionality of the power line coupler and the power line bridge can be included in one device or distributed in more than one device. The power line coupler may include a power line coupling device that communicates data signals with a power line, circuitry to condition the data signal, circuitry to handle bi-directional signal transfer, circuitry to enable the use of an electrical isolator, circuitry to provide operational power from the power line, and may be designed to be self-contained. The power line coupler may include circuitry to communicate with the power line coupler and circuitry to convert data signals to a second format for communication to a customer premise.

Figure 1:
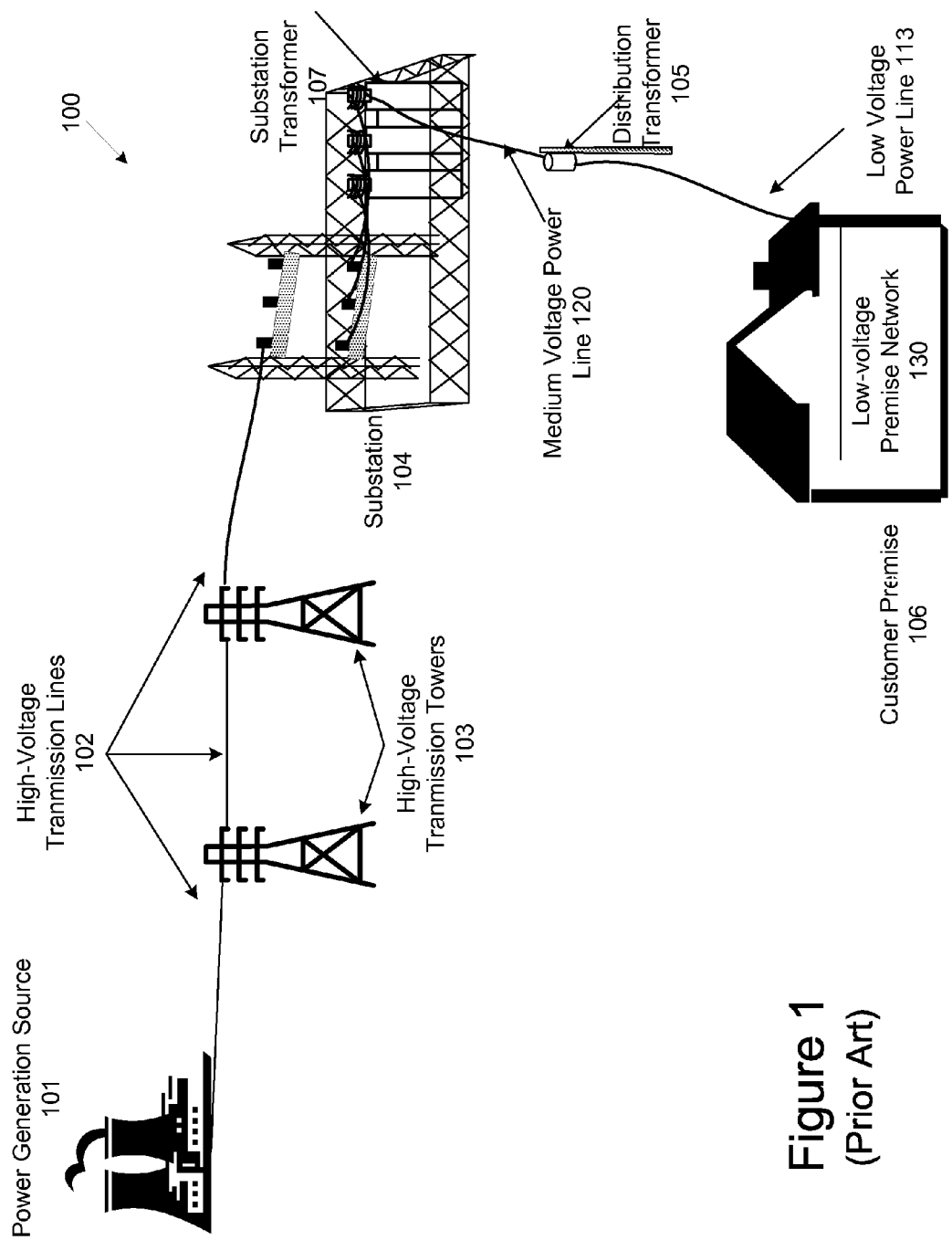
FIG. 1 is a diagram of an exemplary power distribution system with which the invention may be employed.

An exemplary power distribution system is shown in FIG. 1. As shown in FIG. 1, power distribution system 100 is a medium voltage half loop power distribution system that is common to the United States. The invention, however, may be employed with other power distribution systems, such as, for example, a high voltage delivery system that is common to European countries, as well as other power distribution systems.

Power distribution system 100 includes components for power generation and power transmission and delivery. As shown in FIG. 1, a power generation source 101 is a facility that produces electric power. Power generation source 101 includes a generator (not shown) that creates the electrical power. The generator may be a gas turbine or a steam turbine operated by burning coal, oil, natural gas, or a nuclear reactor, for example. Power generation source 101 typically provides three-phase AC power. The generated AC power typically has a voltage as high as approximately 25,000 volts.

A transmission substation (not shown) increases the voltage from power generation source 101 to high-voltage levels for long distance transmission on high-voltage transmission lines 102. Typical voltages found on high-voltage transmission lines 102 range from 69 to in excess of 800 kilovolts (kV). High-voltage transmission lines 102 are supported by high-voltage transmission towers 103. High-voltage transmission towers 103 are large metal support structures attached to the earth, so as to support the transmission lines and provide a ground potential to system 100. High-voltage transmission lines 102 carry the electric power from power generation source 101 to a substation 104.

In addition to high-voltage transmission lines 102, power distribution system 100 includes medium voltage power lines 120 and low voltage power line 113. Medium voltage is typically from about 1000 V to about 100 kV and low voltage is typically from about 100 V to about 240 V. As can be seen, power distribution systems typically have different voltage portions. Transformers are often used to convert between the respective voltage portions, e.g., between the high voltage portion and the medium voltage portion and between the medium voltage portion and the low voltage portion. Transformers have a primary side for connection to a first voltage and a secondary side for outputting another (usually lower) voltage. Transformers are often referred to as a step down transformers because they typically "step down" the voltage to some lower voltage. Transformers, therefore, provide voltage conversion for the power distribution system. This is convenient for power distribution but inconvenient for data communication because the transformers can degrade data signals, as described in more detail below.

A substation transformer 107 is located at substation 104. Substation 104 acts as a distribution point in system 100 and substation transformer 107 steps-down voltages to reduced voltage levels. Specifically, substation transformer 107 converts the power on high-voltage transmission lines 102 from high voltage levels to medium voltage levels for medium voltage power lines 120. In addition, substation 104 may include an electrical bus (not shown) that serves to route the medium voltage power in multiple directions. Furthermore, substation 104 often includes circuit breakers and switches (not shown) that permit substation 104 to be disconnected from high-voltage transmission lines 102, when a fault occurs on the lines.

Substation 104 typically is connected to at least one distribution transformer 105. Distribution transformer 105 may be a pole-top transformer located on a utility pole, a pad-mounted transformer located on the ground, or a transformer located under ground level. Distribution transformer 105 steps down the voltage to levels required by a customer premise 106, for example. Power is carried from substation transformer 107 to distribution transformer 105 over one or more medium voltage power lines 120. Power is carried from distribution transformer 105 to customer premise 106 via one or more low voltage lines 113. Also, distribution transformer 105 may function to distribute one, two, three, or more phase currents to customer premise 106, depending upon the demands of the user. In the United States, for example, these local distribution transformers typically feed anywhere from one to ten homes, depending upon the concentration of the customer premises in a particular location.

Transformer 105 converts the medium voltage power to low voltage power. Transformer 105 is electrically connected to medium voltage power lines 120 on the primary side of the transformer and low voltage power lines 113 on the secondary side of the transformer. Transformers act as a low-pass filter, passing low frequency signals (e.g., 50 or 60 Hz power signals) and impeding high frequency signals (e.g., frequencies typically used for data communication) from passing from the transformer primary side to the transformer secondary side. As such, a data communication system using power lines 120 for data transmission faces a challenge in passing the data signals from the medium voltage power lines 120 to customer premises 106.

Figure 2:
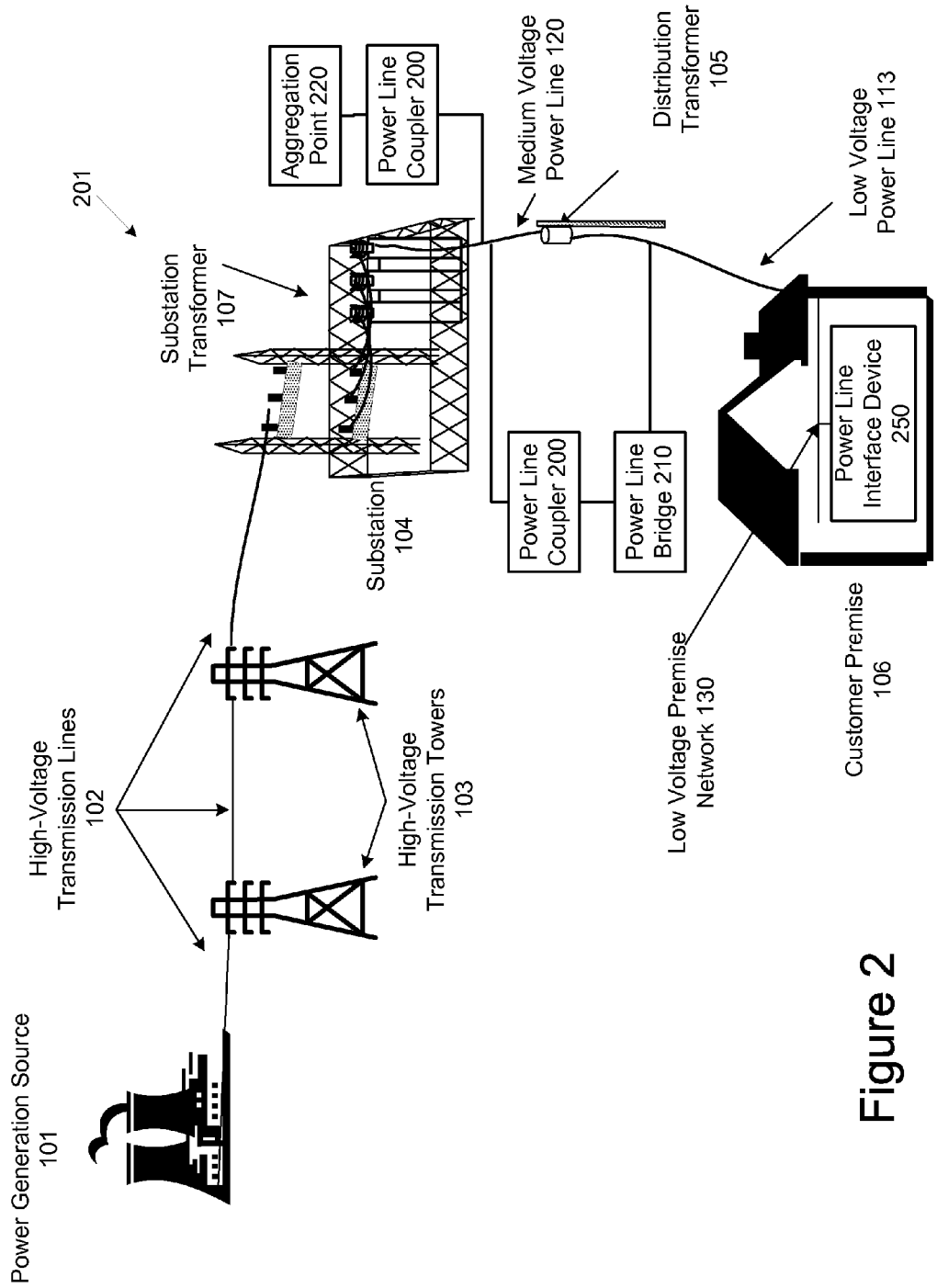
FIG. 2 is a diagram of the exemplary power distribution system of FIG. 1 modified to operate as a data communication system, in accordance with an embodiment of the invention.

FIG. 2 illustrates the power distribution system of FIG. 1 as modified for operation as a data communication system, in accordance with an embodiment of the invention. As described above, a power distribution system is typically separated into high voltage power lines, medium voltage power lines, and low voltage power lines that extend to customer premises 106. The high voltage power lines typically have the least amount of noise and least amount of reflections. These high voltage power lines have the highest potential bandwidth for data communications. This is convenient because it is the portion that concentrates the bandwidth from the other low and medium voltage portions. The type of signal modulation used on this portion can be almost any signal modulation used in communications (Code Division Multiple Access (CDMA), Time Division Multiple Access (TDMA), Frequency Division Multiplex (FDM), Orthogonal Frequency Division Multiplex (OFDM), and the like). Typically, OFDM is used on both the low and medium voltage portions. A modulation producing a wideband signal such as CDMA that is relatively flat in the spectral domain may be used to reduce radiated interference to other systems while still delivering high data communication rates.

Medium voltage power lines 120 and low voltage power lines 113 typically have some noise present from electrical appliances and reflections due to the "web" of wires in those portions. Low power voltage lines 113 often have more noise than medium voltage power lines 120. These portions of the power distribution system typically support a lower bandwidth than the high voltage power lines and therefore, usually employ a more intelligent modulation scheme (typically with more overhead). There are several companies with commercially available chip sets to perform modulation schemes for local area networks (LANs) such as, for example: Adaptive Networks (Newton, Mass.), Inari (Draper, Utah), Intellion (Ocala, Fla.), DS2 (Valencia, Spain) and Itran (Beer-Sheva, Israel).

As shown in FIG. 2, a power line coupler 200 communicates with medium voltage power line 120 and a power line bridge 210 communicates with low voltage power line 113. Further, power line coupler 200 and power line bridge 210 communicate with each other to allow data signals to bypass transformer 105, as described in more detail below. A power line interface device 250 can plug into an electrical outlet and operates to allow customers to access the data signal on the low voltage power line 113. An aggregation point 220 operates to allow a service provider to access data signals on medium voltage power line 120. It should be appreciated that although power line coupler 200 and power line bridge 210 are shown in FIG. 2 as being located at a specific location, the power line coupler and the power line bridge functionality may be located in various locations on the power system.

Figure 3:
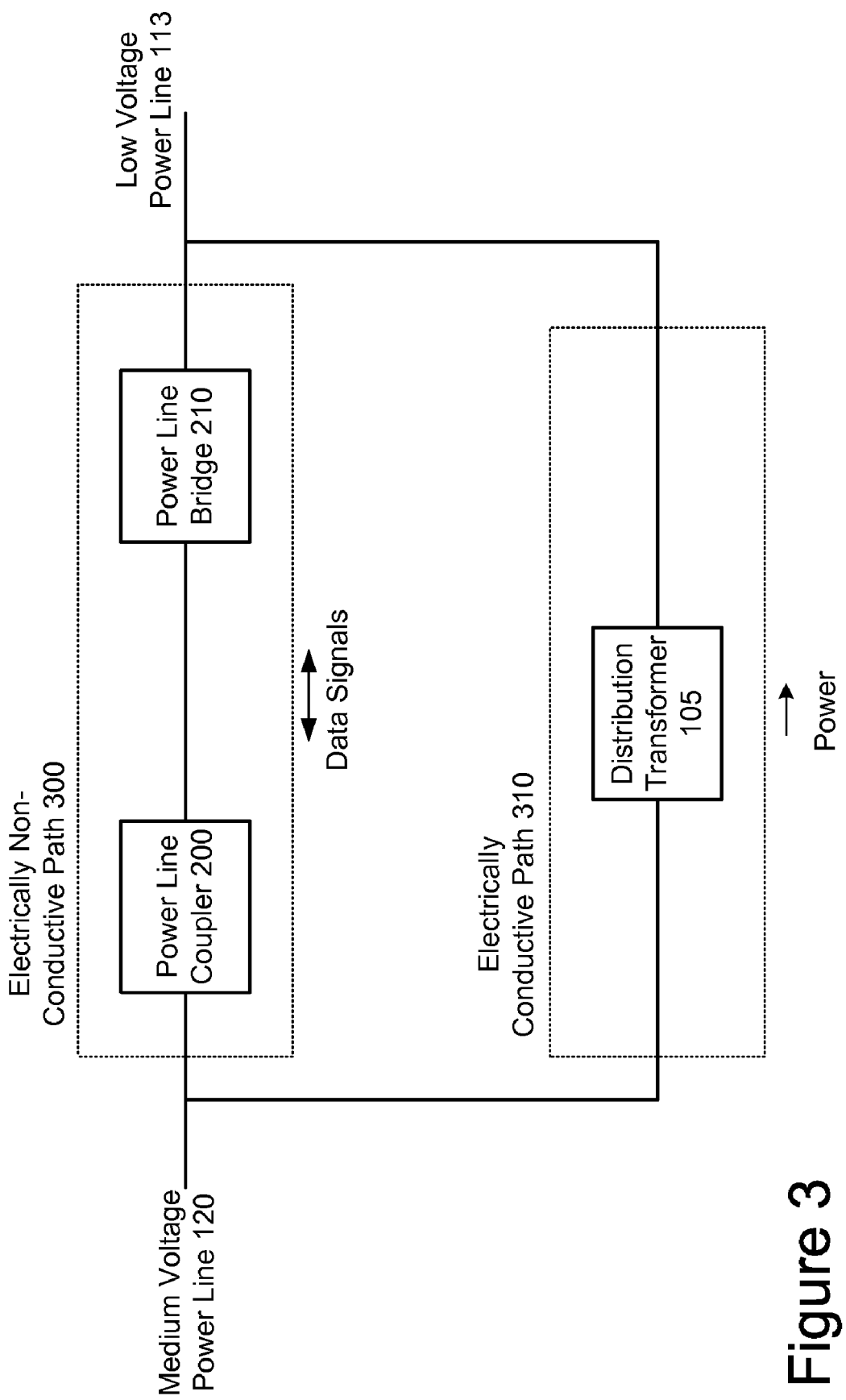
FIG. 3 is a block diagram of a portion of a data communication system, in accordance with an embodiment of the invention.

Returning to power line coupler 200 and power line bridge 210, FIG. 3 illustrates an example of their operation. As described above, bridging data signals between portions of the power distribution system can be a problem, because of the low pass filtering aspect of a transformer. To overcome the problem, power line coupler 200 and power line bridge 210 form an electrically non-conductive path 300 for communicating non-electrically conducting signals around transformer 105, thereby bypassing the low-pass filtering of transformer 105. While electrically non-conductive path 300 does not pass significant amounts of power, it does allow data signals to bypass transformer 105. That is, power line coupler 200 interfaces data signals to medium voltage power lines 120 on the primary side of transformer 105 and power line bridge 210 interfaces data signals to low voltage power lines 113 on the secondary side of transformer 105.

Power line coupler 200 and power line bridge 210 communicate with each other, thereby allowing data signals to bypass transformer 105, thus avoiding the filtering of the high frequency data signal that otherwise would occur in transformer 105. Lower frequency power signals continue to flow from medium voltage power lines 120 to low voltage power lines 113 via transformer 105. Power line coupler 200 provides electrical isolation between medium voltage power lines 120 and low voltage power lines 113 by substantially preventing power from flowing over electrically non-conductive path 300.

Figure 4:
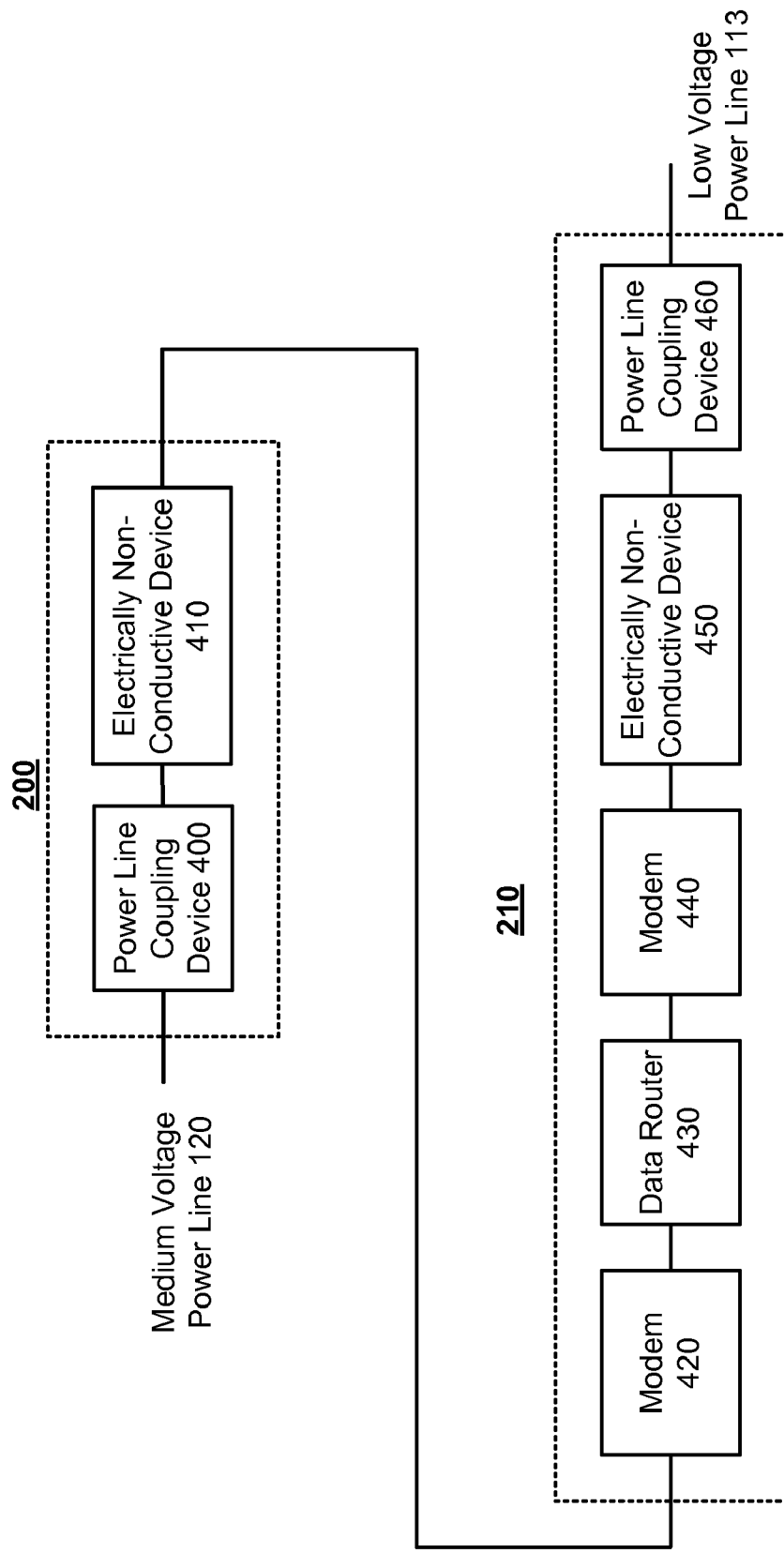
FIG. 4 is a block diagram of a portion of a data communication system, in accordance with an embodiment of the invention.

FIG. 4, illustrates more detail of power line coupler 200 and power line bridge 210. As shown in FIG. 4, power line coupler 200 includes a power line coupling device 400 and an electrically non-conductive device 410.

Power line coupling device 400 communicates data signals with medium voltage power line 120. Power line coupling device 400 may include, for example, a current transformer, an inductor, a capacitor, an antenna, and the like.

Electrically non-conductive device 410 provides electrical isolation between medium voltage power lines 120 and low voltage power lines 113 and communicates non-electrically conducting signals. Electrically non-conductive device 410 may be a fiber optic cable, a light pipe, a sufficiently wide air gap, a sufficiently wide dielectric material, and the like.

Power line bridge 210 may include a modem 420, a data router 430, a modem 440, an electrically non-conductive device 450, and a power line coupling device 460.

Modem 420 modulates and demodulates data signals between power line coupler 200 and data router 430. Modem 420 typically is selected to optimize the communication of the data signals over medium voltage power line 120. For example, modem 420 may be selected to operate with a 50 MHz carrier frequency. Further, modem 420 may be selected to use a modulation technique, such as, for example, CDMA, TDMA, FDM, OFDM, and the like.

Router 430 routes digital data signals between modem 420 and modem 440. Router 430 may receive and send data packets, match data packets with specific messages and destinations, perform traffic control functions, perform usage tracking functions, authorization functions, throughput control functions, and the like.

Modem 440 modulates and demodulates data signals between power line coupler 460 and data router 430. Modem 440 typically is selected to optimize the communication of the data signals over low voltage power line 113. Modem 440 may be selected to operate with a carrier frequency within the range of 2 to 24 MHz, for example. Further, modem 420 may be selected to modulate using a technique, such as, for example, CDMA, TDMA, FDM, OFDM, and the like. The use of modems 420 and 440 allows the modulation technique for each modem to be individually matched to the characteristics of the power line with which it communicates. If however, the same modulation technique is used on both low voltage power lines 113 and medium voltage power lines 120, modem 420, data router 430, and modem 440 may be omitted from power line bridge 210.

Electrically non-conductive device 450 provides electrical isolation between low voltage power lines 113 and modem 440. Electrically non-conductive device 450 may be a fiber optic cable, a light pipe, a sufficiently wide air gap, a sufficiently wide dielectric material, and the like. Because low voltage power lines 113 operate at a low voltage, electrically non-conductive device 450 may include a capacitor. That is, a capacitor can provide a sufficient electrical isolation between low voltage power lines 113 and a customer. Power line coupling device 460 may include a current transformer, an inductor, a capacitor, an antenna, and the like.

Figure 5:
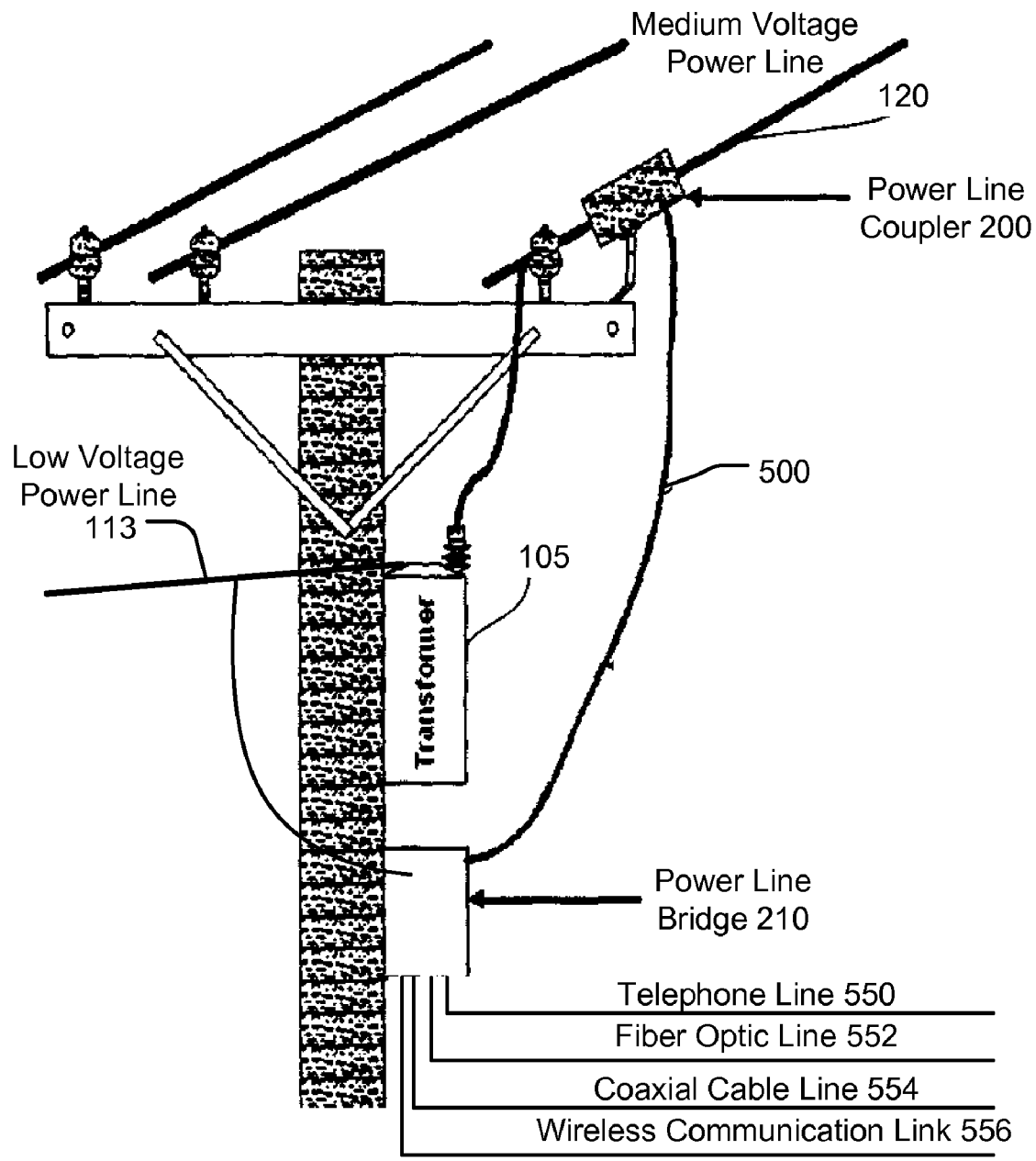
FIG. 5 is a perspective view of a power line coupler and a power line bridge installed at a telephone pole of a power distribution system, in accordance with an embodiment of the invention.

FIG. 5 illustrates an installation of power line coupler 200 and power line bridge 210 to a power distribution system. As shown in FIG. 5, power line coupler 200 is mounted proximate medium voltage power line 120 and power line bridge 210 is mounted proximate low voltage power line 113. Power line coupler 200 and power line bridge 210 are in communication via communication medium 500. Communication medium 500 may be a fiber optic cable, an air gap, a dielectric material, and the like.

Power line coupler 200 receives a data signal from medium voltage power line 120. Power line coupler 100 converts the data signal to a non-electrically conducting signal (i.e., a signal that can be transmitted over a non-electrically conductive path). A non-electrically conducting signal may be a light signal, a radio frequency signal, a microwave signal, and the like. Power line coupler 200 transmits the signal over communication medium 500. Power line bridge 210 receives the non-electrically conducting signal and conditions the signal for communication over low voltage power line 113 to customer premise 106 (as discussed with reference to FIG. 2).

Rather than communicating data signals to customer premise 106 via low voltage power line 113, power line bridge 210 may use other communication media. FIG. 5 depicts several other techniques for communicating data signals to customer premise 106. For example, power line bridge 210 may convert the data signals to electric data signals and communicate the electric data signals via telephone line 550 or coaxial cable line 554. Such communication may be implemented in a similar fashion to the communication with low voltage power line 113.

Power line bridge 210 may convert the data signal to radio signals for communication over a wireless communication link 556. In this case, customer premise 106 includes a radio transceiver for communicating with wireless communication link 556. In this manner, power line bridge 210 functions as a communication interface, converting the non-electrically conducting signal to a signal appropriate for communication to customer premise 106. Wireless communication link 556 may be a wireless local area network implementing a network protocol in accordance with the IEEE 802.11 standard.

Alternatively, light signals may be communicated to customer premise 106 directly via a fiber optic 552. In this alternative embodiment, power line bridge may convert the data signals to light signals for communication over fiber optic line 552. Alternatively, the data signals already may be in light form and therefore, power line coupler may communicate directly with user premise 106. In this embodiment, customer premise 106 may have a fiber optic connection for carrying data signals, rather than using the internal wiring of customer premise 106.

Figure 6:
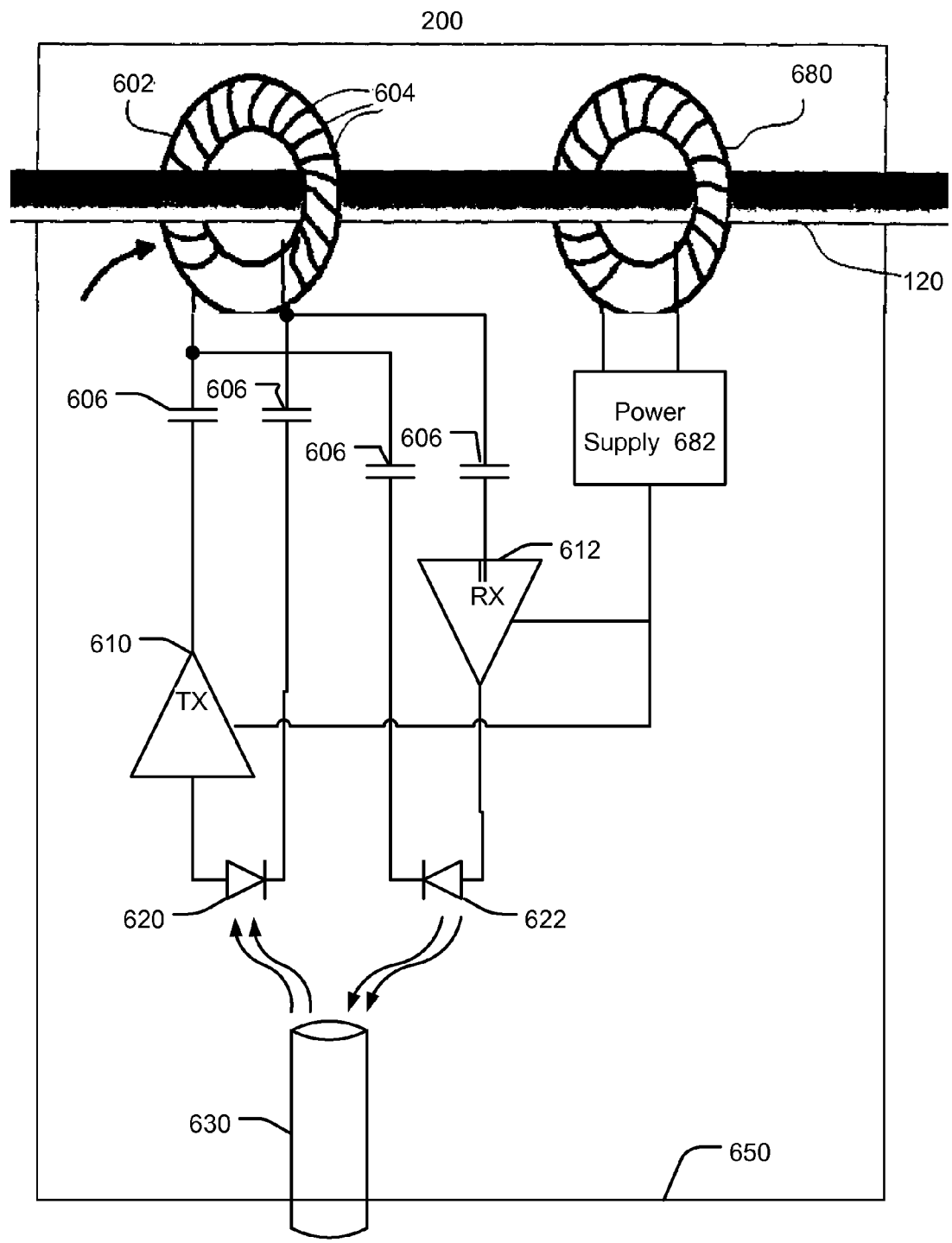
FIG. 6 is a schematic of a power line coupler, in accordance with an embodiment of the invention.

FIG. 6, illustrates more details of power line coupler 200. As shown in FIG. 6, power line coupler 200 includes an inductor 602, capacitors 606, transmit circuitry 610, receive circuitry 612, transmit optoelectronic device 620, and receive optoelectronic device 622.

Inductor 602 communicates data signals with medium voltage power line 120 via magnetic coupling. Inductor 602 may be a toroidally shaped inductor that is inductively coupled with medium voltage power line 120. Inductor 602 includes a toroidally shaped magnetic core with windings 604 disposed to facilitate flux linkage of the data signal on medium voltage power line 120. The number and orientation of windings 604 typically is selected for increased flux linkage. Further, the permeability of the magnetic core typically is selected for high coupling with the high frequency data signal and a high signal to noise ratio. Also, the permeability characteristics of inductor 602 may be selected to reduce saturation of the core. If the core becomes saturated, the data signal may become "clipped."

Medium voltage power line 120 may be disposed through inductor 602. To facilitate easy installation and minimal impact to customer service, inductor 602 may include a hinge. With such a hinge, inductor 602 may simply snap around medium voltage power line 120 using existing utility tools and techniques. In this manner, installation of inductor 602 can be performed without disrupting power to the power users and without stripping any insulation from medium voltage power line 120.

Inductor 602 is electrically connected to capacitors 606. Capacitors 606 provide some electrical isolation between optoelectronic devices 620, 622 and inductor 602. Capacitors 606 further provide filtering of the power signal from the data signal. That is, the data signal, which typically is a high frequency signal, passes across capacitors 606 while the power signal, which typically is a lower frequency (e.g., 50 or 60 Hz), is substantially prevented from passing across capacitors 606. While such filtering need not be implemented necessarily, filtering typically is included to simplify the design of system. Alternatively, such filtering may be implemented elsewhere within system 200, for example, in transmit circuitry 610, receive circuitry 612, power line bridge 210, and the like.

Capacitors 606 are electrically connected to transmit circuitry 610 and receive circuitry 612. Transmit circuitry 610 and receive circuitry 612 may amplify the data signal, filter the data signal, buffer the data signal, modulate and demodulate the signal, and the like. Transmit circuitry 610 typically is selected to maximize the power of the data signal to keep the signal-to-noise ratio of the data signal at an acceptable level. Receive circuitry 612 typically includes an amplifier designed to handle the lowest expected received data signal level. At a system level, the modulation and demodulation techniques typically are selected to reduce interference between transmit and receive signals.

Transmit circuitry 610 and receive circuitry 612 are electrically connected to transmit optoelectronic device 620 and receive optoelectronic device 622, respectively. Transmit optoelectronic device 620 converts a light data signal, for example, from communication medium 630 to an electrical data signal for use by transmit circuitry 610. Transmit optoelectronic device 620 may include a light emitting diode, a laser diode, a vertical cavity surface emitting laser, and the like. Receive optoelectronic device 622 converts an electrical data signal from receive circuitry 612 to a light data signal for transmission through communication medium 630. Receive optoelectronic device 622 may include a photosensitive diode, photosensitive transistor, and the like.

Transmit optoelectronic device 620 and receive optoelectronic device 622 are in communication with communication medium 630. As shown, light signals are communicated between both transmit circuitry 610 and receive circuitry 612 and communication medium 630.

Communication medium 630 communicates light signals between power line coupler 100 and the power line bridge 210. Communication medium is electrically non-conductive, thereby breaking the electrically conductive power path between power line coupler 200 and power line bridge 210. Communication medium 630 may include a light pipe, a fiber-optic cable, and the like.

In this manner, data signals on the power lines are converted to light signals and are transmitted over optical communication medium 630. Similarly, light signals from optical communication medium 630 are converted to electrical signals for communication with the power lines. Communication medium 630, being electrically non-conductive, provides the increased safety that is desired by many power distribution companies by not allowing substantial power to flow through communication medium 630.

Power line coupler 200 includes a power supply inductor 680 and a power supply 682. Power supply inductor 680, constructed similar to inductor 602, inductively draws power from medium voltage power line 120. Power supply inductor 680 typically is selected to have magnetic characteristics appropriate for coupling power signals from medium voltage power line 120. Power supply 682 receives power from inductor 680 (e.g. alternating current (ac) power) and converts the power to an appropriate form for use by transmit circuitry 610, receive circuitry 612, and the like (e.g., direct current (dc) power). As such, power line coupler 200 can be a "closed" system, internally deriving its own power and thereby avoiding the use of batteries (which may be costly and impractical).

Power line coupler 200 includes a housing 650 to protect it from exposure to the environmental conditions. Housing 650 may be constructed with high dielectric, corrosive resistant materials, fasteners, adhesives, and sealed conduit openings. Housing 650 may further be designed to reduce the risk of exposure to the voltage potential present on medium voltage power line 120.

In the embodiment illustrated in FIG. 6, communication medium 630 is a fiber optic cable that provides electrical isolation between medium voltage power line 120 and low voltage power line 113. Other communication media may be used to provide such electrical isolation. For example, inductor 602 may include an annularly shaped dielectric material disposed coaxially between medium voltage power line 120 and inductor 602. The dielectric material allows inductor 602 to be magnetically coupled to medium voltage power line 120, thereby allowing communication of data signals. The dielectric material does not allow significant power to pass from medium voltage power line 120 to low voltage power line 113. Alternatively, rather than converting the electric data signals to light data signals, power line coupler 200 may convert the electric data signals to wireless data signals, such as, for example, radio frequency signals.

Figure 7:
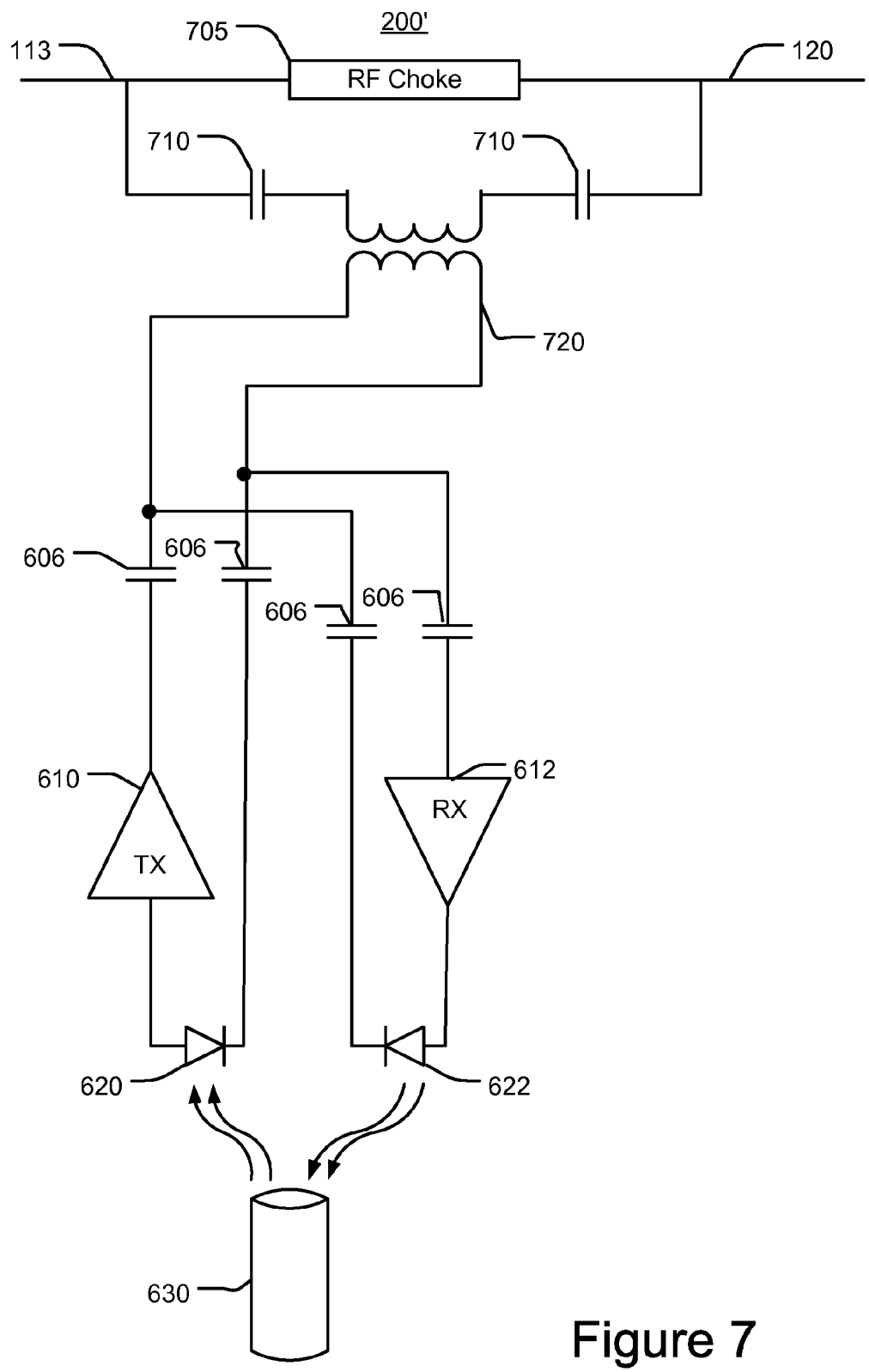
FIG. 7 is a schematic of another power line coupler, in accordance with another embodiment of the invention.

FIG. 7 illustrates another embodiment of a power line coupler 200'. As shown in FIG. 7, power line coupler 200' includes a radio frequency (RF) choke 705, capacitors 710, a transformer 720, transmit circuitry 610, receive circuitry 612, transmit optoelectronic device 620, and receive optoelectronic device 622.

RF choke 705 may be disposed around and is directly connected to medium voltage power line 120 and may comprise ferrite beads. RF choke 705 operates as a low pass filter. That is, low frequency signals (e.g., a power signal having a frequency of 50 or 60 Hz) pass through RF choke 705 relatively unimpeded (i.e., RF choke 705 can be modeled as a short circuit to low frequency signals). High frequency signals (e.g., a data signal), however, do not pass through RF choke 705; rather, they are absorbed in RF choke 705 (i.e., RF choke 705 can be modeled as an open circuit to high frequency signals). As such, the voltage across RF choke 705 includes data signals but substantially no power signals. This voltage (i.e., the voltage across RF choke 705) is applied to transformer 720 via capacitors 710 to receive data signals from medium voltage power line 120. To transmit data signals to medium voltage power line 120, a data signal is applied to transformer 720, which in turn communicates the data signal to RF choke 705 through capacitors 710.

Capacitors 710 provide some electrical isolation between medium voltage power line 120 and transformer 720. Capacitors 710 further provides filtering of stray power signals. That is, the data signal passes across capacitors 710 while any power signal is substantially prevented from passing across capacitors 710. Such filtering can be implemented elsewhere within the system or not implemented at all.

Transformer 720 may operate as a differential transceiver. That is, transformer 720 may operate to repeat data signals received from RF choke 705 to receive circuitry 612 and to repeat data signals received from transmit circuitry 610 to RF choke 705. Transformer 720 also provides some electrical isolation between medium voltage power line 120 and low voltage power line 113.

Capacitors 606 may be electrically connected between transmit circuitry 610 and receive circuitry 612 and transformer 720. Transmit circuitry 610 and receive circuitry 612 are electrically connected to transmit optoelectronic device 620 and receive optoelectronic device 622, respectively. Transmit optoelectronic device 620 and receive optoelectronic device 622 are in communication with communication medium 630. Power line coupler 200' may include a power supply inductor 680, a power supply 682, and a housing 650, similar to that shown in FIG. 6.

In the embodiments illustrated in FIGS. 6 and 7, communication medium 630 is a fiber optic cable that provides electrical power isolation between medium voltage power line 120 and low voltage power line 113. Other communication media may be used to provide such electrical power isolation. For example, inductor 602 may include an annularly shaped dielectric material (not shown) disposed coaxially within inductor 602. The dielectric material allows inductor 602 to be magnetically coupled to medium voltage power line 120, thereby allowing communication of data signals. The dielectric material does not allow significant power to pass from medium voltage power line 120 to low voltage power line 113. Alternatively, inductor 602 may communicate with a wireless transceiver (not shown) that converts data signals to wireless signals. In this case, communication medium 630 is air.

Returning to FIG. 2, power line coupler 200 communicates data signals with power line bridge 210, that is turn communicates the data signals to low voltage power line 113. The data signal carried by low voltage power line 113 is then provided to power line interface device 250 via low-voltage premise network 130. Power line interface device 250 is in communication low-voltage premise network 130 and with various premise devices that are capable of communicating over a data network, such as for example, a telephone, a computer, and the like.

Power line interface device 250 converts a signal provided by power line bridge 210 to a form appropriate for communication with premise devices. For example, power line interface device 250 may convert an analog signal to a digital signal for receipt at customer premise 106, and converts a digital signal to an analog signal for data transmitted by customer premise 106.

Power line interface device 250 is located at or near the connection of low voltage power line 113 with customer premise 106. For example, power line interface device 250 may be connected to a load side or supply side of an electrical circuit breaker panel (not shown). Alternatively, power line interface device 250 may be connected to a load side or supply side of an electrical meter (not shown). Therefore, it should be appreciated that power line interface device 250 may be located inside or outside of customer premise 106.

A "web" of wires distributes power and data signals within customer premise 130. The customer draws power on demand by plugging an appliance into a power outlet. In a similar manner, the user may plug power line interface device 250 into a power outlet to digitally connect data appliances to communicate data signals carried by the power wiring. Power line interface device 250 serves as an interface for customer data appliances (not shown) to access data communication system 200. Power line interface device 250 can have a variety of interfaces for customer data appliances. For example, power line interface device 250 can include a RJ-11 Plain Old Telephone Service (POTS) connector, an RS-232 connector, a USB connector, a 10 Base-T connector, and the like. In this manner, a customer can connect a variety of data appliances to data communication system 200. Further, multiple power line interface devices 250 can be plugged into power outlets in the customer premise 130, each power line interface device 250 communicating over the same wiring in customer premise 130.

In alternative embodiments, rather than using low voltage power lines 113 to carry the data signals and power line interface device 250 to convert the data signals, power line bridge 210 converts data signals to be carried by another medium, such as, for example, a wireless link, a telephone line, a cable line, a fiber optic line, and the like.

Figure 8:
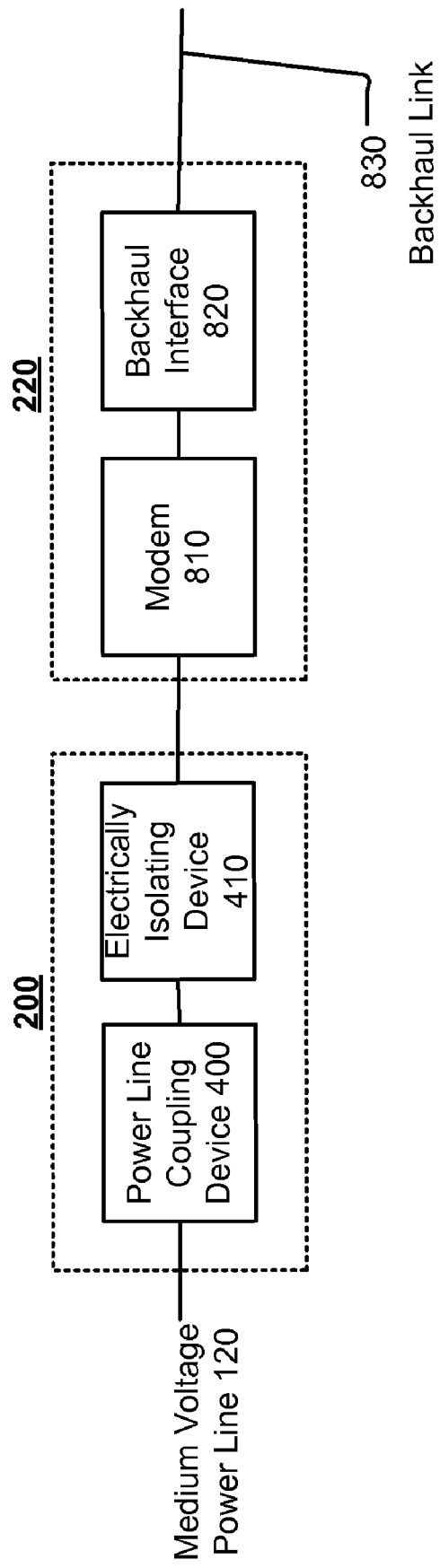
FIG. 8 is a diagram of another portion of a data communication system, in accordance with another embodiment of the invention.

As described above a customer can access data communication system 200 via power line interface device 250. A service provider, however, typically accesses data communication system 200 via aggregation point 220, as shown in FIG. 2. FIG. 8 shows more details of aggregation point 220. As shown in FIG. 8, power line coupling device 200 communicates between medium voltage power line 120 and aggregation point 220. Aggregation point 220 includes a modem 810, a backhaul interface 820, and a backhaul link 830. Aggregation point 220 allows a service provider to access data communication system 200.

Figure 9:
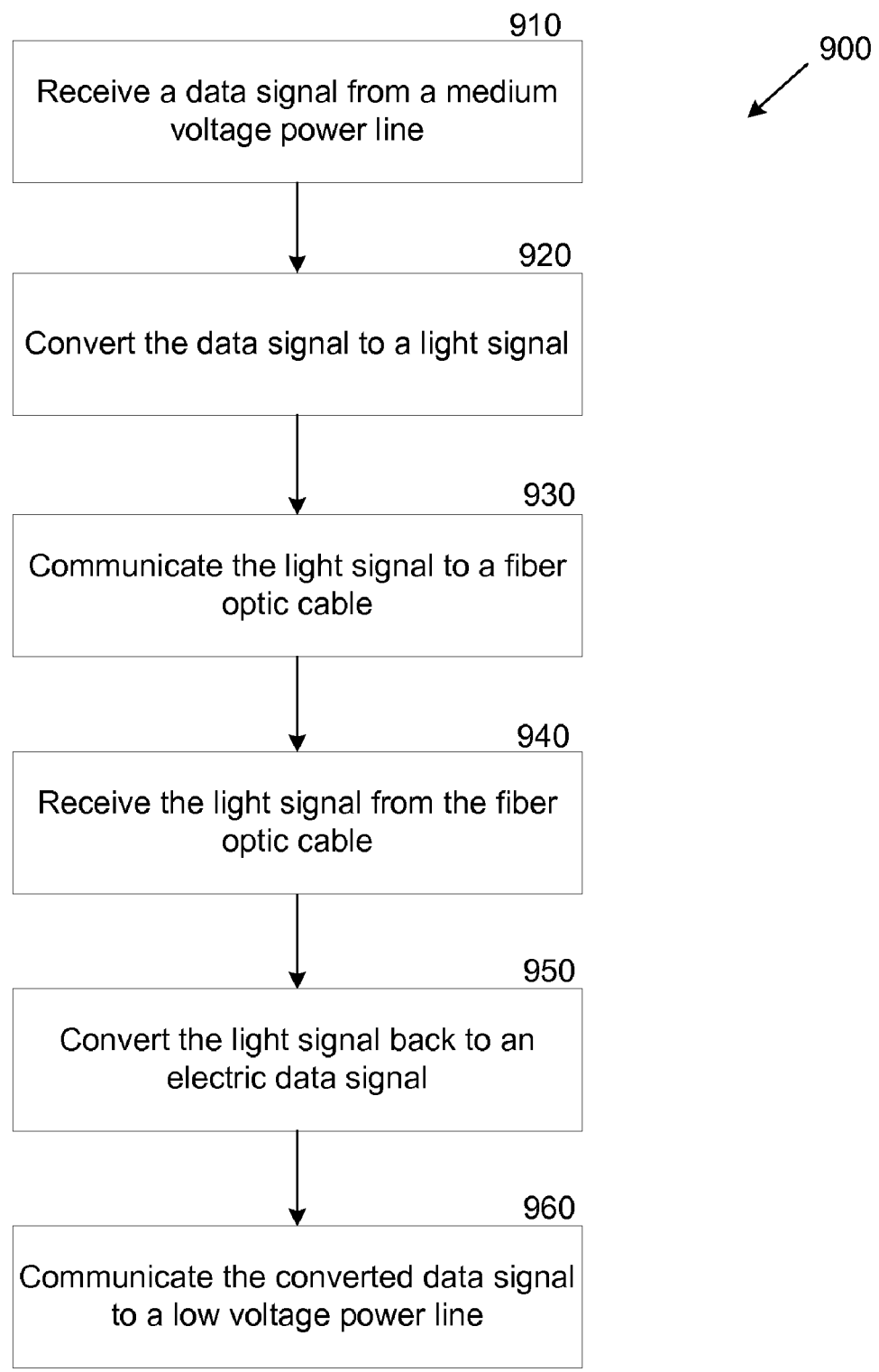
FIG. 9 is a flow diagram of an illustrative method for data communication over a power line, in accordance with an embodiment of the invention.

FIG. 9 is a flow diagram of an illustrative method 900 for communicating data between medium voltage power line 120 and low voltage power line 113. As shown in FIG. 9 at step 910, a data signal is received from medium voltage power line 120. Typically, the data signal is in the form of a high-frequency electrical signal. At step 920, the data signal is converted from an electrical signal to a light signal. At step 930, the light signal is communicated to a fiber optic cable and at step 940, the light signal is received. At step 950 the light signal is converted back to an electric data signal and at step 960, the electric data signal is communicated to medium voltage power line 120.

The invention is directed to directed to a power line coupler and a power line bridge that communicate data signals across a transformer that would otherwise filter the data signals from passing through the transformer. Further, the power line coupler provides high electrical isolation between the transformer primary side and secondary side. The power line coupler can be used to provide data services to residences and service providers. Possible applications include remote utility meter reading, Internet Protocol (IP)-based stereo systems, IP-based video delivery systems, and IP telephony, Internet access, telephony, video conferencing, and video delivery, and the like.

It is to be understood that the foregoing illustrative embodiments have been provided merely for the purpose of explanation and are in no way to be construed as limiting of the invention. Words which have been used herein are words of description and illustration, rather than words of limitation. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for communicating over a power line having a voltage greater than one thousand volts, the power line forming part of a power distribution system that supplies power to a plurality of customer premises via a plurality of external low voltage power lines, the system comprising:
a first device comprising:
a coupler configured to couple data to and from the power line;
a first modem configured to communicate data over the power line via said coupler; and
a wireless transceiver communicatively coupled to said first modem and configured to wirelessly communicate with a plurality of utility devices disposed at a plurality of customer premises thereby bypassing the external low voltage power lines.

2. The system of claim 1, wherein said wireless transceiver is configured to form a wireless local area network with said plurality of utility devices.

3. The system of claim 1, further comprising a routing device in communication with said first modem.

4. The system of claim 3, wherein said routing device is configured to perform throughput control functions.

5. The system of claim 3, wherein said routing device is configured to monitor usage data.

6. The system of claim 1, wherein said first device is configured to monitor usage data.

7. The system of claim 1, wherein said coupler comprises:
a conductor having a first end and a second end; and
wherein said first end is coupled to the power line at a first location and the second end is coupled to the power line at a second location spaced apart from the first location.

8. The system of claim 1, wherein said coupler comprises a magnetically permeable toroid configured to be disposed substantially around the entire circumference of the power line.

9. The system of claim 1, wherein said coupler couples data via capacitance.

10. The system of claim 1, wherein said wireless transceiver wirelessly is configured to communicate via a substantially compatible IEEE 802.11 protocol.

11. The system of claim 1, further comprising a second device having a second modem configured to communicate with said first modem over the power line.

12. The system of claim 11, wherein said first modem and said second modem are configured to communicate via orthogonal frequency division multiplex (OFDM) signals.

13. The system of claim 11, wherein said first modem and said second modem are configured to communicate via wideband signals.

14. The system of claim 11, wherein said first modem and said second modem are configured to communicate with each other via frequency division multiplex (FDM) communications.

15. The system of claim 11, wherein said first modem and said second modem are configured to communicate with each other via Code Division Multiple Access (CDMA) communications.

16. The system of claim 11, wherein said first modem and said second modem are configured to communicate with each other via Time Division Multiple Access (TDMA) communications.

17. The system of claim 11, wherein said first modem and said second modem are configured to communicate with each other using time division communications.

18. The system of claim 1, wherein said first device further comprises a power supply configured to inductively draw power from the power line.

19. The system of claim 1, wherein said first modem is configured to communicate Internet Protocol (IP) data packets.

20. The system of claim 1, wherein the plurality of utility devices comprises a plurality of utility meters.

21. A method of communicating data over a power line having a voltage greater than one thousand volts, the power line forming part of a power distribution system that supplies power to a plurality of customer premises via a plurality of external low voltage power lines, the method comprising:
   receiving first data in a first data signal from the power line;
   demodulating the first data signal;
   wirelessly transmitting the first data to a utility device disposed at a customer premises thereby bypassing the external low voltage power lines;
   wirelessly receiving second data from a utility device disposed at a customer premises to thereby bypass the external low voltage power line;
   modulating one or more carriers with the second data to form a second data signal; and
   coupling the second data signal onto the power line.

22. The method of claim 21, further comprising establishing a wireless local area network with a plurality of utility devices.

23. The method of claim 21, further comprising routing the first data prior to wirelessly transmitting the first data.

24. The method of claim 21, further comprising monitoring data usage.

25. The method of claim 21, further comprising controlling data throughput.

26. The method of claim 21, wherein said receiving first data is performed with a coupler that comprises:
   a conductor having a first end and a second end; and
   wherein said first end is coupled to the power line at a first location and the second end is coupled to the power line at a second location spaced apart from the first location.

27. The method of claim 21, wherein said receiving first data comprises inductively coupling the first data signal from the power line.

28. The method of claim 21, wherein said receiving first data comprises capacitively coupling the first data signal from the power line.

29. The method of claim 21, wherein said wirelessly transmitting the first data comprises wirelessly transmitting the first data with an IEEE 802.11 protocol.

30. The method of claim 21, wherein the second data signal comprises an OFDM signal.

31. The method of claim 21, wherein the first data signal comprises a wideband signal.

32. The method of claim 21, further comprising inductively drawing power from the power line to power a wireless transceiver.

33. The method of claim 21, further comprising providing authorization functions.

34. The method of claim 21, further comprising wirelessly transmitting third data to a second utility device disposed at a customer premises thereby bypassing the external low voltage power lines.

35. The method of claim 21, wherein the second data comprises meter data.

36. The method of claim 21, wherein the first data comprises IP data.

37. The method of claim 21, wherein receiving first data in a first data signal comprises receiving the first data via a frequency division multiplexing (FDM) communication.

38. The method of claim 21, wherein receiving first data in a first data signal comprises receiving the first data via a Code Division Multiple Access (CDMA) communication.

39. The method of claim 21, wherein receiving first data in a first data signal comprises receiving the first data via a Time Division Multiple Access (TDMA) communication.

40. The method of claim 21, wherein receiving first data in a first data signal comprises receiving the first data via a time division communication.

41. The method of claim 21, further comprising determining a destination for the first data and wherein the destination includes an address of the utility device for said wirelessly transmitting.

42. A method of communicating data over a power line having a voltage greater than one thousand volts, the power line forming part of a power distribution system that supplies power to a plurality of customer premises via a plurality of external low voltage power lines, the method comprising:
   receiving a downstream data packet with first data from the power line;
   determining a destination the downstream data packet, wherein the destination includes one or more utility devices at one or more customer premises; and
   wirelessly transmitting the first data of the downstream data packet to the one or more utility devices thereby bypassing the external low voltage power lines.

43. The method of claim 42, further comprising:
   wirelessly receiving upstream data from one of the one or more utility devices; and
   coupling the upstream data onto the power line.

44. The method of claim 42, further comprising establishing a wireless local area network with a plurality of utility devices.

45. The method of claim 42, further comprising monitoring data usage.

46. The method of claim 42, further comprising controlling data throughput.

47. The method of claim 42, wherein said receiving is performed with a coupler comprising:
   a conductor having a first end and a second end; and
   wherein said first end is coupled to the power line at a first location and the second end is coupled to the power line at a second location spaced apart from the first location.

48. The method of claim 42, wherein the downstream data packet comprises an IP data packet.

49. The method of claim 42, wherein said receiving comprises inductively coupling the downstream data packet from the power line.

50. The method of claim 42, wherein said receiving comprises capacitively coupling the downstream data packet from the power line.

51. The method of claim 42, wherein said wirelessly transmitting comprises wirelessly transmitting the first data via a substantially compatible IEEE 802.11 protocol.

52. The method of claim 42, wherein the downstream data packet is received via an OFDM communication.

53. The method of claim 42, wherein the downstream data packet is received via wideband signals.

54. The method of claim 42, further comprising inductively drawing power from the power line.

55. A device for communicating over a power line having a voltage greater than one thousand volts, the power line forming part of a power distribution system that supplies power to a plurality of customer premises via a plurality of external low voltage power lines, the device comprising:
- a coupler configured to couple data to and from the power line;
- a first housing;
- first circuitry disposed in said first housing and configured to transmit and receive data over the power line via said coupler;
- a second housing;
- second circuitry disposed in said second housing and configured to wirelessly communicate with a plurality of remote utility meters, each of the plurality of remote utility meters configured to meter one of the plurality of customer premises; and
- wherein said first circuitry is communicatively coupled to said second circuitry via a data path.

56. The device of claim 55, wherein said data path comprises a wired medium.

57. The device of claim 56, wherein said wired medium comprises a fiber optic conductor.

58. The device of claim 55, wherein said data path comprises an electrically non-conductive path.

59. The device of claim 55, wherein said first circuitry is configured to communicate over the power line FDM communications.

60. The device of claim 55, wherein said first circuitry is configured to communicate over the power line via CDMA communications.

61. The device of claim 55, wherein said first circuitry is configured to communicate over the power line via TDMA communications.

62. The device of claim 55, wherein said first circuitry is configured to communicate over the power line via time division communications.

63. The device of claim 55, wherein said first circuitry is configured to communicate over the power line via OFDM communications.

64. The device of claim 55, wherein said first circuitry is configured to communicate over the power line via wideband signals.

65. The device of claim 55, wherein said second circuitry includes a transceiver configured to communicate via an IEEE 802.11 protocol.

66. The device of claim 65, wherein said wireless transceiver is configured to form a wireless local area network with said plurality of remote utility meters.

67. The device of claim 55, wherein said first housing and said second housing are configured to be mounted to the same utility pole.

68. The device of claim 55, wherein said first circuitry is configured to communicate IP data packets.

69. The device of claim 55, further comprising a routing device in communication with said second circuitry.

70. The device of claim 69, wherein said routing device is configured to perform throughput control functions.

71. The device of claim 69, wherein said routing device is configured to monitor usage data.

72. The device of claim 55, wherein said coupler comprises:
- a conductor having a first end and a second end; and
- wherein said first end is coupled to the power line at a first location and the second end is coupled to the power line at a second location spaced apart from the first location.

73. The device of claim 55, wherein said coupler comprises a magnetically permeable toroid configured to be disposed substantially around the entire circumference of the power line.

74. The device of claim 55, wherein said coupler couples data via capacitance.

* * * * *

UNITED STATES PATENT AND TRADEMARK OFFICE
CERTIFICATE OF CORRECTION

PATENT NO. : 7,453,352 B2 Page 1 of 2
APPLICATION NO. : 11/696896
DATED : November 18, 2008
INVENTOR(S) : Kline It is certified that error appears in the above-identified patent and that said Letters Patent is hereby corrected as shown below:

On the Title Page on page 5, Item -56-, under "Other Publications", line 29, delete "Initital" and insert -- Initial --, therefor.

On the Title Page on page 5, Item -56-, under "Other Publications", line 54, delete "standarization" and insert -- standardization --, therefor.

On the Title Page on page 5, Item -56-, under "Other Publications", line 67, delete "201" and insert -- © --, therefor.

On the Title Page on page 6, Item -56-, under "Other Publications", line 9, delete "201" and insert -- © --, therefor.

On the Title Page on page 6, Item -56-, under "Other Publications", line 1, delete "Evoluation" and insert -- Evolution --, therefor.

On the Title Page on page 6, Item -56-, under "Other Publications", line 8, delete "conslting" and insert -- consulting --, therefor.

On the Title Page on page 6, Item -56-, under "Other Publications", line 18, delete "conenct" and insert -- connect --, therefor.

On Sheet 1 of 9, in Fig. 1 (Above Reference Numeral 102), line 2, delete "tranmission" and insert -- transmission --, therefor.

On Sheet 1 of 9, in Fig. 1 (Above Reference Numeral 103), line 2, delete "tranmission" and insert -- transmission --, therefor.

In column 11, line 59, after "directed to" delete "directed to".

UNITED STATES PATENT AND TRADEMARK OFFICE
CERTIFICATE OF CORRECTION

PATENT NO. : 7,453,352 B2
APPLICATION NO. : 11/696896
DATED : November 18, 2008
INVENTOR(S) : Kline It is certified that error appears in the above-identified patent and that said Letters Patent is hereby corrected as shown below:

In column 15, line 25, in Claim 55, delete "pluralitv" and insert -- plurality --, therefor.

Signed and Sealed this

Third Day of March, 2009

JOHN DOLL
*Acting Director of the United States Patent and Trademark Office*